United States Patent
Shin et al.

(10) Patent No.: US 11,029,841 B2
(45) Date of Patent: Jun. 8, 2021

(54) ELECTRONIC DEVICE FOR GENERATING AUGMENTED REALITY EMOJI AND METHOD THEREOF

(71) Applicant: Samsung Electronics Co., Ltd., Gyeonggi-do (KR)

(72) Inventors: Sangmin Shin, Gyeonggi-do (KR); Ohyoon Kwon, Gyeonggi-do (KR); Deokgyoon Yoon, Gyeonggi-do (KR); Jiwoo Lee, Gyeonggi-do (KR); Yeunwook Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/701,465

(22) Filed: Dec. 3, 2019

(65) Prior Publication Data
US 2020/0174656 A1 Jun. 4, 2020

(30) Foreign Application Priority Data

Dec. 4, 2018 (KR) .................. 10-2018-0154620

(51) Int. Cl.
*G06F 3/0488* (2013.01)
*G06T 11/00* (2006.01)
*G06F 3/0354* (2013.01)

(52) U.S. Cl.
CPC .......... *G06F 3/04883* (2013.01); *G06T 11/00* (2013.01); *G06F 3/03545* (2013.01)

(58) Field of Classification Search
CPC ... G06F 3/04883; G06F 3/03545; G06T 11/00
See application file for complete search history.

(56) References Cited

U.S. PATENT DOCUMENTS

| | | | |
|---|---|---|---|
| 8,694,899 B2 | 4/2014 | Goossens et al. |
| 9,652,134 B2 | 5/2017 | Goossens et al. |
| 10,042,536 B2 | 8/2018 | Goossens et al. |
| 10,325,018 B2 | 6/2019 | Calvo et al. |
| 10,379,719 B2 | 8/2019 | Scapel et al. |

(Continued)

FOREIGN PATENT DOCUMENTS

| | | |
|---|---|---|
| KR | 10-2017-0067547 A | 6/2017 |
| WO | 2018/213500 A1 | 11/2018 |

OTHER PUBLICATIONS

International Search Report dated Mar. 30, 2020.

*Primary Examiner* — Tadesse Hailu
(74) *Attorney, Agent, or Firm* — Cha & Reiter, LLC

(57) ABSTRACT

Certain embodiments include an electronic device comprising a housing, a touchscreen display viewable through a portion of the housing, at least one processor disposed inside the housing and operatively connected with the touchscreen display; and a memory disposed within the housing and operatively connected with the processor, wherein the memory stores instructions that, when executed, cause the at least one processor to perform a plurality of operations, the plurality of operations comprising displaying a first augmented reality (AR) emoji on a window capable of receiving at least one first stroke input, through the touchscreen display, receiving the at least one first stroke input while displaying the first AR emoji on the window, and displaying a second AR emoji, based at least partially on a position and a shape of the at least one first stroke input.

18 Claims, 15 Drawing Sheets

(56) References Cited

U.S. PATENT DOCUMENTS

| | | |
|---|---|---|
| 10,521,091 B2 | 12/2019 | Anzures et al. |
| 2011/0296324 A1 | 12/2011 | Goossens et al. |
| 2012/0059787 A1* | 3/2012 | Brown .............. H04M 1/72544 |
| | | 706/52 |
| 2015/0332088 A1* | 11/2015 | Chembula .............. G06K 9/468 |
| | | 382/203 |
| 2016/0261675 A1 | 9/2016 | Block et al. |
| 2017/0140214 A1* | 5/2017 | Matas ................ G06K 9/00302 |
| 2017/0185254 A1* | 6/2017 | Zeng .................... G06F 3/0482 |
| 2017/0357324 A1* | 12/2017 | Chaudhri ................ G06T 11/20 |
| 2017/0357427 A1* | 12/2017 | Wilson .................. G06F 3/0362 |
| 2017/0358117 A1 | 12/2017 | Goossens et al. |
| 2017/0372056 A1* | 12/2017 | Narasimhan ............ G06F 21/36 |
| 2018/0024726 A1* | 1/2018 | Hviding .............. G06F 3/04845 |
| | | 715/204 |
| 2018/0107650 A1 | 4/2018 | Calvo et al. |
| 2018/0300542 A1 | 10/2018 | Waddell et al. |
| 2018/0329606 A1* | 11/2018 | Jurzak .................... G06F 9/451 |
| 2018/0336715 A1* | 11/2018 | Rickwald ........... G06K 9/00315 |
| 2019/0311189 A1* | 10/2019 | Bryant, III .......... G06F 3/04845 |

* cited by examiner

ELECTRONIC DEVICE FOR GENERATING AUGMENTED REALITY EMOJI AND METHOD THEREOF

CROSS-REFERENCE TO RELATED APPLICATION(S)

This application is based on and claims priority under 35 U.S.C. § 119 to Korean Patent Application No. 10-2018-0154620, filed on Dec. 4, 2018, in the Korean Intellectual Property Office, the disclosure of which is incorporated by reference herein its entirety.

BACKGROUND

1. Field

The disclosure relates to an electronic device for generating an augmented reality (AR) emoji and a method thereof.

2. Description of Related Art

Written communication lacks many aspects of interpersonal communication. In interpersonal communication, the exact same words can convey different meanings, depending on a variety of other factors. For example, the same words can have different meanings when the speaker is angry, than when the user is happy. With sarcasm, the meaning conveyed is the exact opposite of the words used. With written communication, such as texts, the reader does not have the benefit of observing the writer's disposition, and context to discern which one of the various meanings the writer may be conveying.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, an electronic device comprising a housing, a touchscreen display viewable through a portion of the housing, at least one processor disposed inside the housing and operatively connected with the touchscreen display; and a memory disposed within the housing and operatively connected with the processor, wherein the memory stores instructions that, when executed, cause the at least one processor to perform a plurality of operations, the plurality of operations comprising displaying a first augmented reality (AR) emoji on a window capable of receiving at least one first stroke input, through the touchscreen display, receiving the at least one first stroke input while displaying the first AR emoji on the window, and displaying a second AR emoji, based at least partially on a position and a shape of the at least one first stroke input.

In accordance with another aspect of the disclosure, a method of an electronic device comprising displaying a first AR emoji on a window configured to receive at least one first stroke input; receiving the at least one first stroke input on the window; and displaying a second AR emoji, based at least partially on a position and a shape of the at least one first stroke input.

In accordance with another aspect of the disclosure an electronic device comprises a housing; a touchscreen display viewable through a portion of the housing; a wireless communication circuit disposed within the housing, and configured to communicate with an external server; at least one processor disposed within the housing and operatively connected with the display and the wireless communication circuit; and a memory disposed within the housing and operatively connected with the at least one processor, wherein the memory stores instructions that, when executed, cause the at least one processor to perform a plurality of operations comprising: displaying a first augmented reality (AR) emoji not indicating a gesture on a window capable of receiving at least one first stroke input, through the display; receiving the at least one first stroke input while displaying the first AR emoji on the window; transmitting information about the at least one first stroke input to the external server, through the wireless communication circuit; receiving information about a second AR emoji indicating a gesture corresponding to the at least one first stroke input from the external server, through the wireless communication circuit; displaying the second AR emoji, through the display, based at least partially on information about the received second AR emoji; receiving a first user input for transmitting the second AR emoji while the second AR emoji is displayed; generating a first image file including the second AR emoji in response to the received first user input; and transmitting the generated first image file to an external electronic device, through the wireless communication circuit. Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

With regard to description of drawings, similar components may be marked by similar reference numerals.

DETAILED DESCRIPTION

An electronic device may recognize an appearance of a user (e.g., at least one of his/her face, his/her body, or an accessory that the user wears) by using a camera and may generate a three-dimensional AR emoji based on the recognized appearance of the user. The electronic device may provide a personalized emoticon to the user through the AR emoji.

An electronic device may transmit an AR emoji (or an image of the AR emoji) indicating a specific gesture to an external electronic device for the purpose of expressing the emotion of the user. To transmit the AR emoji indicating the gesture, the electronic device may display a list of AR emojis indicating a number of predetermined different gestures, through a display. The display may receive a user input selecting one AR emoji from the displayed list. As the number of kinds of AR emojis indicating gestures increases to express more emotions of the user, the number of AR emojis to be displayed through the display also increases. This may increase the time needed to select an AR emoji that the user wants. Also, storing more AR emojis consumes more memory.

Aspects of the disclosure may address at least the above-mentioned problems and/or disadvantages and to provide at least the advantages described below. Accordingly, an aspect of the disclosure is to provide an electronic device and a method for generating an AR emoji indicating a gesture depending on a strobe input received on a display.

Hereinafter, certain embodiments of the disclosure will be described with reference to accompanying drawings. However, those of ordinary skill in the art will recognize that modification, equivalent, and/or alternative on certain embodiments described herein can be variously made without departing from the scope and spirit of the disclosure.

Figure 1:
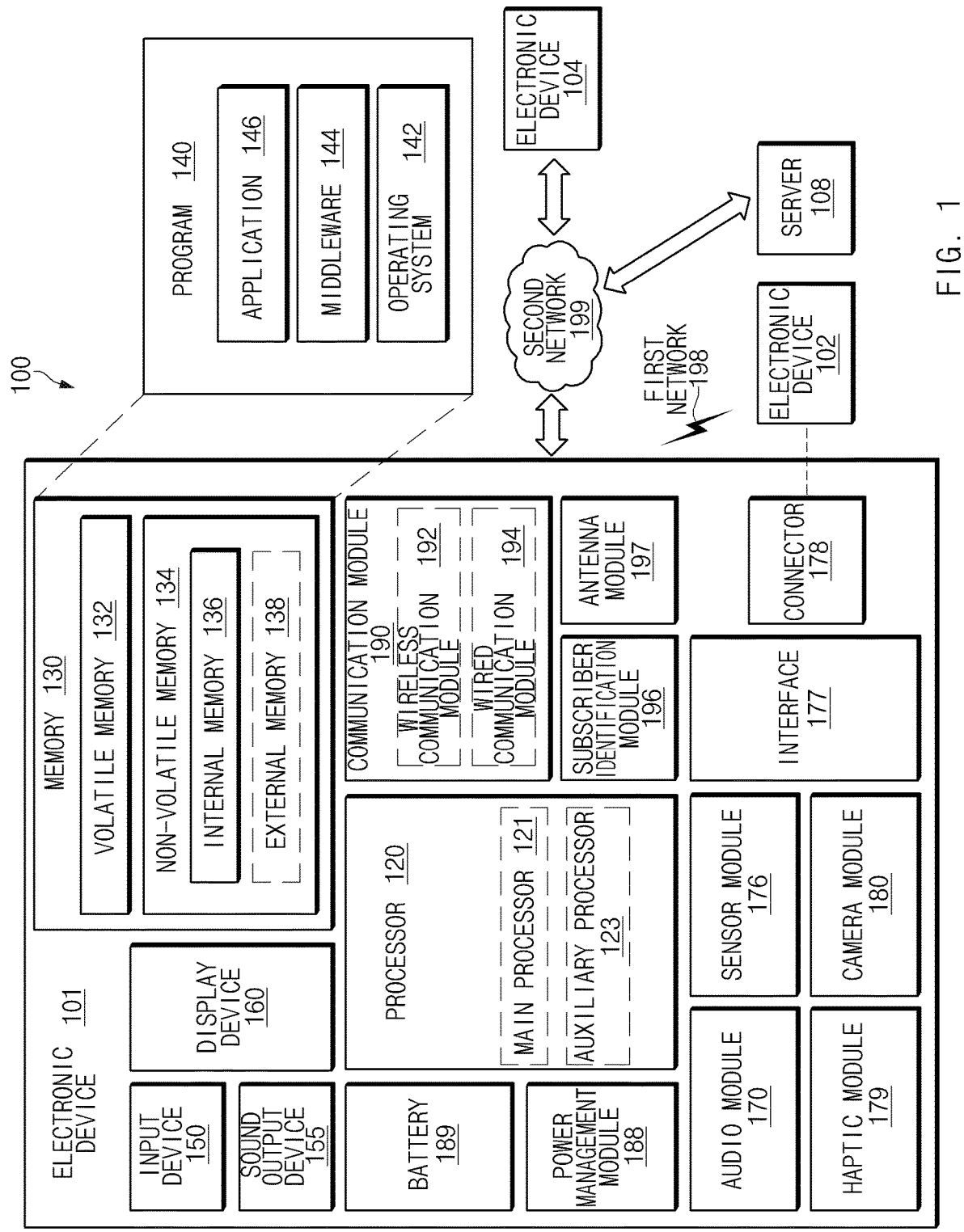
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121. It shall be understood that the term processor 120 can include a single processor or multiple processors 120 acting together.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
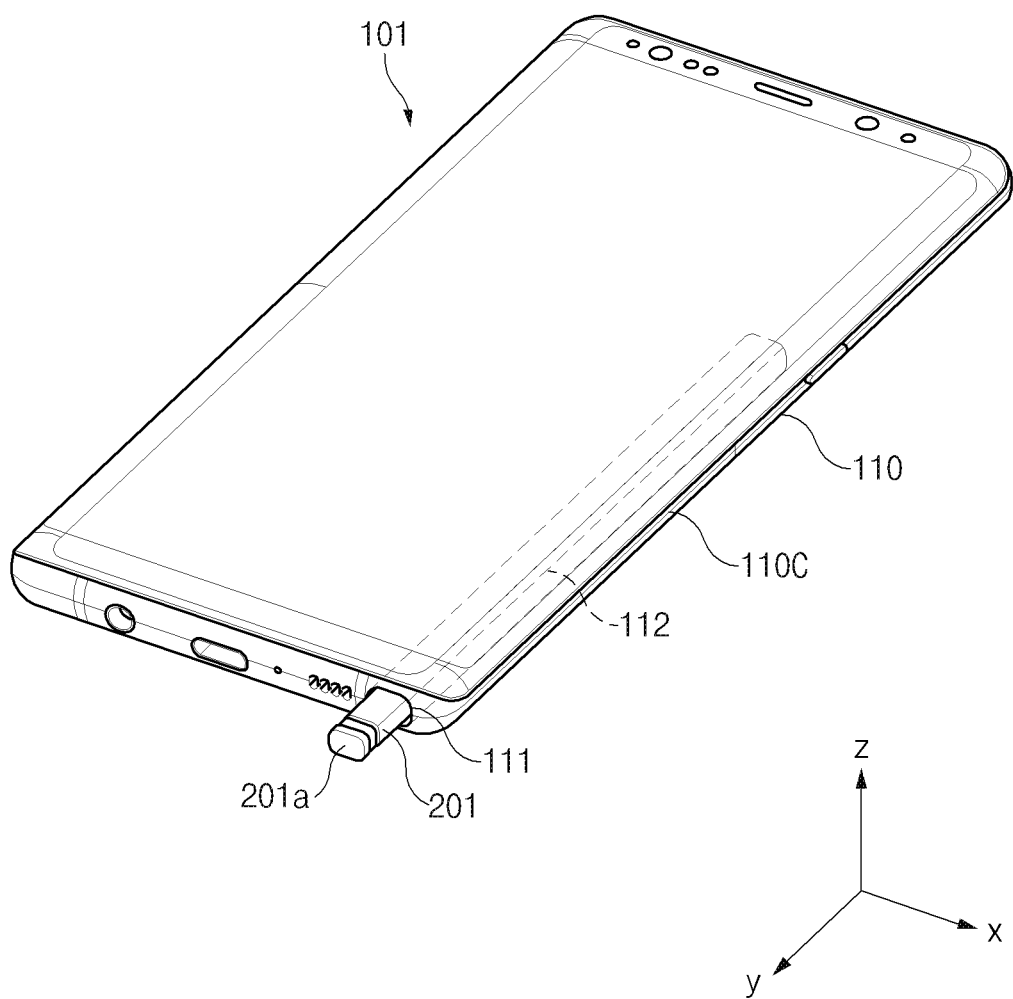
FIG. 2 is a perspective view of an electronic device including a digital pen according to certain embodiments.
Figure 3:
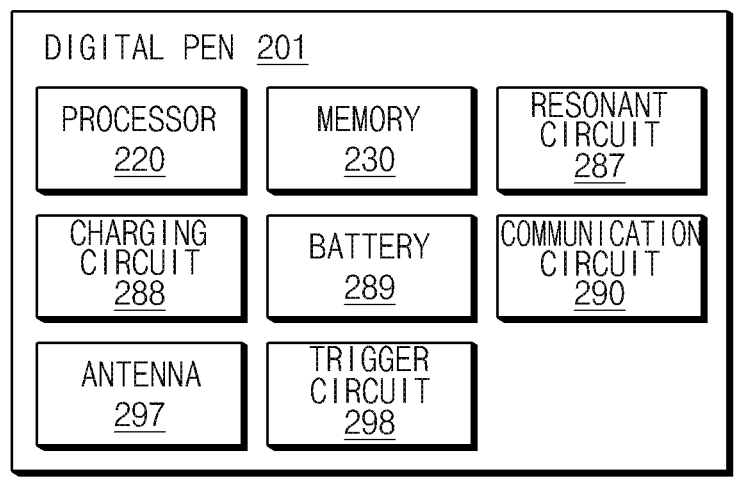
FIG. 3 illustrates a block diagram of a digital pen according to certain embodiments.
Figure 4:
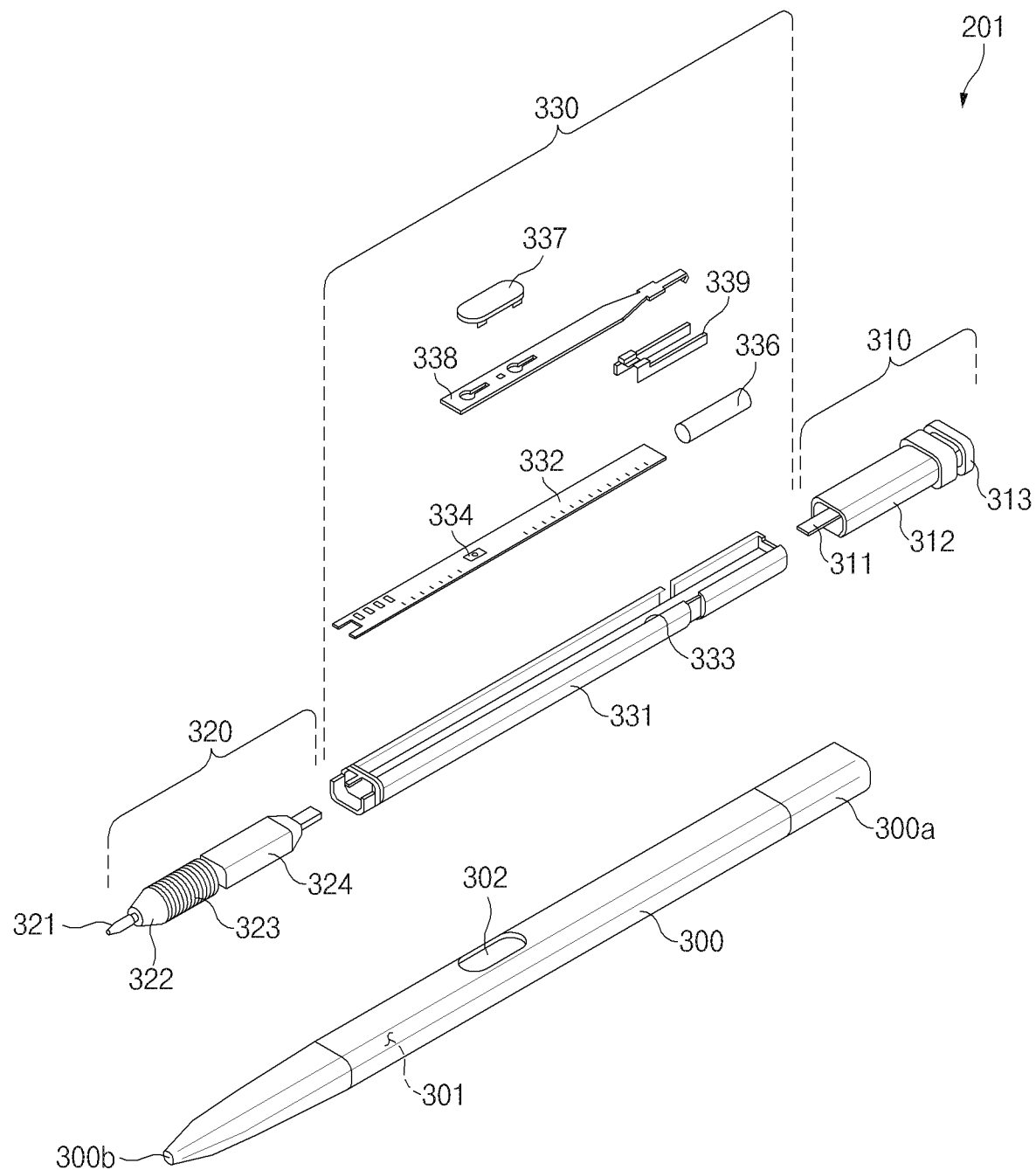
FIG. 4 is an exploded perspective view of a digital pen according to certain embodiments.

A user can use the electronic device 101 to communicate with others in a variety of ways, including written messages, such as SMS/MMS texts, over-the-top messages using applications such as Facebook or WhatsApp, and email, to name a few. To better convey the user's message, the written messages can include emoji's that are generated by the electronic device 101 based at least in part on a stroke input on the display. In certain embodiments, the stroke input can be made by a digital pen or a stylus. FIG. 2 shows the electronic device 101 housing a digital pen. FIGS. 3 and 4 describe the digital pen.

Electronic Device with Digital Pen

FIG. 2 is a perspective view of the electronic device 101 including a digital pen 201 according to certain embodiments.

Referring to FIG. 2, the electronic device 101 according to an embodiment may include the configuration illustrated in FIG. 1 and may include a structure into which the digital pen 201 (e.g., a stylus pen) is able to be inserted. The electronic device 101 may include a housing 110, and may include a hole 111 at one portion of the housing 110, for example, one portion of a side surface 110C. According to an embodiment, the electronic device 101 may include a receiving space 112 connected with the hole 111, and the digital pen 201 may be inserted into the receiving space 112. According to embodiments illustrated, the digital pen 201 may include a button 201a, which is capable of being pressed, at one end portion thereof such that the digital pen 201 is easily pulled out from the receiving space 112 of the electronic device 101. When the button 201a is pushed, a repulsion mechanism (e.g., at least one spring) that is configured to link to the button 201a acts, and the digital pen 201 may be detached from the receiving space 112.

In certain embodiments, tip of the digital pen 201 can be traversed across the display 160 of the electronic device, resulting in a demarcation of pixels in a particular color that is different from surrounding pixels, where the tip of the digital pen 201 make contact. In certain embodiments, the digital pen 201 can be used to provide stroke inputs as will be described later.

Digital Pen

FIG. 3 illustrates a block diagram of the digital pen 201 according to certain embodiments.

Referring to FIG. 3, the digital pen 201 according to an embodiment may include a processor 220, a memory 230, a resonant circuit 287, a charging circuit 288, a battery 289, a communication circuit 290, an antenna 297, and/or a trigger circuit 298. In some embodiments, in the digital pen 201, the processor 220, at least a part of the resonant circuit 287, and/or at least a part of the communication circuit 290 may be implemented on a printed circuit board (PCB) or may be implemented in the form of a chip. The processor 220, the resonant circuit 287, and/or the communication circuit 290 may be electrically connected with the memory 230, the charging circuit 288, the battery 289, the antenna 297, or the trigger circuit 298. The digital pen 201 according to an embodiment may be implemented only with a resonant circuit and a button.

According to an embodiment, the processor 220 may include a generic processor configured to execute a customized hardware module or software (e.g., an application program). The processor 220 may include a hardware component (function) or a software component (program) including at least one of the following included in the digital pen 201: various sensors, a data measurement module, an input/output interface, a module to manage a state or an environment of the digital pen 201, or a communication module. The processor 220 may include one of hardware, software, or firmware, or a combination of two or more thereof. According to an embodiment, the processor 220 may receive a proximity signal corresponding to an electromagnetic signal that is generated from a digitizer (e.g., at least a part of the display device 160) of the electronic device 101 through the resonant circuit 287. When the proximity signal is identified, the processor 220 may control the resonant circuit 287 such that an electro-magnetic resonance (EMR) input signal is transmitted to the electronic device 101.

According to an embodiment, the memory 230 may store information associated with an operation of the digital pen 201. For example, the information may include information for communication with the electronic device 101 and frequency information associated with an input operation of the digital pen 201.

According to an embodiment, the resonant circuit 287 may include at least one of a coil, an inductor, or a capacitor. The resonant circuit 287 may be used for the digital pen 201 to generate a signal including a resonant frequency. For example, to generate a signal, the digital pen 201 may use at least one of an electro-magnetic resonance (EMR) manner, an active electrostatic (AES) manner, or an electrically coupled resonance (ECR) manner. In the case where the digital pen 201 transmits a signal in the EMR manner, the digital pen 201 may generate a signal including a resonant frequency, based on an electro-magnetic field generated from an inductive panel of the electronic device 101. In the case where the digital pen 201 transmits a signal in the AES manner, the digital pen 201 may generate a signal by using the capacity coupling with the electronic device 101. In the case where the digital pen 201 transmits a signal in the ECR manner, the digital pen 201 may generate a signal including a resonant frequency, based on an electric field generated from a capacitive device of the electronic device 101. According to an embodiment, the resonant circuit 287 may be used to change the intensity of the electro-magnetic field or a frequency depending on a manipulating state of the user. For example, the resonant circuit 287 may provide a frequency for recognizing a hovering input, a drawing input, a button input, or an erasing input.

According to an embodiment, when the charging circuit 288 is connected with the resonant circuit 287 based on a switching circuit, the charging circuit 288 may rectify a resonant signal generated from the resonant circuit 287 to a direct current signal so as to be supplied to the battery 289. According to an embodiment, the digital pen 201 may determine whether the digital pen 201 is inserted into the electronic device 101, by using a voltage level of the direct current signal detected from the charging circuit 288.

According to an embodiment, the battery 289 may store energy necessary for an operation of the digital pen 201. For example, the battery 289 may include a lithium-ion battery or a capacitor, and may be rechargeable or exchangeable. According to an embodiment, the battery 289 may be charged by using a power (e.g., a direct current signal (or a direct current power)) provided from the charging circuit 288.

According to an embodiment, the communication circuit 290 may be configured to perform a wireless communication function between the digital pen 201 and the communication module 190 of the electronic device 101. According to an embodiment, the communication circuit 290 may transmit state information and input information of the digital pen 201 to the electronic device 101 by using a short-range communication manner. For example, the communication circuit 290 may transmit direction information (e.g., motion sensor data) of the digital pen 201 obtained through the trigger circuit 298, voice information input through a microphone, or level information of the battery 289. For example, the short-range communication manner may include at least one of a Bluetooth low energy (BLE) manner or a wireless LAN manner.

According to an embodiment, the antenna 297 may be used to transmit a signal or a power to the outside (e.g., the electronic device 101) or to receive a signal or a power from the outside. According to an embodiment, the digital pen 201 may include a plurality of antennas 297 and may select at least one antenna 297 appropriate for a communication manner from among the plurality of antennas 297. The communication circuit 290 may exchange a signal or a power with an external electronic device through the at least one antenna 297 thus selected.

According to an embodiment, the trigger circuit 298 may include at least one button or sensor circuit. According to an embodiment, the processor 220 may identify an input manner (e.g., a touch or a push) or a kind (e.g., an EMR button or a BLE button) of the button of the digital pen 201. According to an embodiment, the sensor circuit may generate an electrical signal or a data value that corresponds to an internal operation state of the digital pen 201 or corresponds to an external environment state. For example, the sensor circuit may include at least one of a motion sensor, a battery level detection sensor, a pressure sensor, a light sensor, a temperature sensor, a geomagnetic sensor, or a biometric sensor. According to an embodiment, the trigger circuit 298 may transmit a trigger signal to the electronic device 101 by using an input signal of the button or a signal obtained through the sensor.

FIG. 4 is an exploded perspective view of the digital pen 201 according to certain embodiments.

Referring to FIG. 4, the digital pen 201 may include a pen housing 300 forming the exterior of the digital pen 201 and an inner assembly in the pen housing 300. In an embodiment illustrated, the inner assembly may include all the parts mounted within a pen and may be inserted into the pen housing 300 by only one assembly operation.

According to an embodiment, the pen housing 300 may be elongated between a first end portion 300a and a second end portion 300b and may include the receiving space 112 therein. The pen housing 300 may have the shape of an ellipse, the cross section of which includes a short axis and a long axis and may be formed in the shape of an elliptic cylinder on the whole. A receiving space 301 of the electronic device 101 may have a cross section, which is elliptic, to correspond to the shape of the pen housing 300. The pen housing 300 may include a synthetic resin (e.g., plastic) and/or a metallic material (e.g., aluminum). According to an embodiment, the second end portion 300b of the pen housing 300 may be formed of a synthetic resin material.

According to an embodiment, the inner assembly may have an elongated shape corresponding to the shape of the pen housing 300. The inner assembly may be roughly divided into three components along a longitudinal direction. For example, the inner assembly may include an ejection member 310 disposed at a location corresponding to the first end portion 300a of the pen housing 300, a coil part 320 disposed at a location corresponding to the second end portion 300b of the pen housing 300, and a circuit board part 330 disposed at a location corresponding to a body of a housing.

According to an embodiment, the ejection member 310 may include a component for pulling out the digital pen 201 from the receiving space 112 of the electronic device 101. According to an embodiment, the ejection member 310 may include a shaft 311, and an ejection body 312 and a button part 313 disposed around the shaft 311 and forming the overall exterior of the ejection member 310. When the inner assembly is completely inserted into the pen housing 300, the part of the ejection member 310, which includes the shaft 311 and the ejection body 312, may be surrounded by the first end portion 300a of the pen housing 300, and the button part 313 (e.g., 201a of FIG. 2) may be exposed to the outside of the first end portion 300a. A plurality of components (not illustrated), for example, cam members or elastic members may be disposed in the ejection body 312 to form a push-pull structure. In an embodiment, the button part 313 may be substantially engaged with the shaft 311 to reciprocate linearly with respect to the ejection body 312. According to certain embodiments, the button part 313 may include a button having a stopper structure that allows the user to pull out the digital pen 201 by using his/her nail. According to an embodiment, the digital pen 201 may include a sensor detecting a linear reciprocating motion of the shaft 311, thus providing another input manner.

According to an embodiment, the coil part 320 may include a pen tip 321 exposed to the outside of the second end portion 300b when the inner assembly is completely inserted into the pen housing 300, a packing ring 322, a coil 323 having a plurality of turns, and/or a pen pressure sensing unit 324 for obtaining a change in pressure when the pen tip 321 is pressed. The packing ring 322 may include epoxy, rubber, urethane, or silicon. The packing ring 322 may be provided for the purpose of waterproofing and dustproofing and may protect the coil part 320 and the circuit board part 330 from moisture when the electronic device 101 and/or the digital pen 201 are infiltrated into water or from dust. According to an embodiment, the coil 323 may form a resonant frequency in a given frequency band (e.g., 500 kHz), and may be combined with at least one element (e.g., a capacitive element (or a capacitor)) to adjust the resonant frequency formed by the coil 323 within a given range.

According to an embodiment, the circuit board part 330 may include a printed circuit board 332, a base 331 covering at least one surface of the printed circuit board 332, and an antenna. According to an embodiment, a substrate seating part 333, on which the printed circuit board 332 is disposed, may be formed on an upper surface of the base 331, and the printed circuit board 332 may be fixed in the state of being seated on the substrate seating part 333. According to an embodiment, the printed circuit board 332 may include an upper surface and a lower surface. A variable capacitor connected with the coil 323 or a switch 334 may be disposed on the upper surface, and a charging circuit, a battery, or a communication circuit may be disposed on the lower surface. The battery may include an electric double layered capacitor (EDLC). The charging circuit is interposed between the coil 323 and the battery and may include a voltage detector circuitry and a rectifier.

According to an embodiment, the antenna may include an antenna structure 339 that is exemplified as illustrated in FIG. 4 and/or an antenna that is embedded in the printed circuit board 332. According to certain embodiments, the switch 334 may be provided on the printed circuit board 332. A side button 337 that is provided on the digital pen 201 may be used to press the switch 334 and may be exposed to the outside through a side opening 302 of the pen housing 300. The side button 337 may be supported by a supporting member 338. When there is no external force acting on the side button 337, the supporting member 338 may provide restoring force such that the side button 337 is returned to or maintained at a specific location.

According to an embodiment, the circuit board part 330 may include a different packing ring such as an O-ring. For example, O-rings that are formed of an elastic material may be disposed at opposite ends of the base 331 to form a sealing structure between the base 331 and the pen housing 300. In any embodiment, the supporting member 338 may be partially in close contact with an inner wall of the pen housing 300 around the side opening to form a sealing structure. For example, as in the packing ring 322 of the coil part 320, the circuit board part 330 may have a waterproof and dustproof structure.

According to an embodiment, the digital pen 201 may include a battery mounting part provided on the upper surface of the base 331 such that a battery 336 is disposed in the battery mounting part. The battery 336 that is able to be mounted on the battery mounting part may include, for example, a cylinder-type battery.

According to an embodiment, the digital pen 201 may include a microphone (not illustrated). The microphone may be directly connected with the printed circuit board 332 or may be connected with a separate flexible printed circuit board (FPCB) (not illustrated) connected with the printed circuit board 332. According to certain embodiments, the microphone may be disposed parallel to the side button 337 in the longitudinal direction of the digital pen 201.

Figure 5:
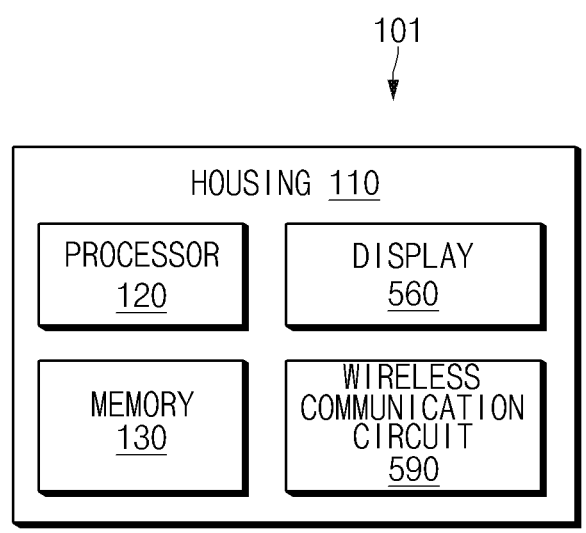
FIG. 5 is a block diagram of an electronic device according to certain embodiments.

FIG. 5 is a functional block diagram of the electronic device 101 according to certain embodiments.

Referring to FIG. 5, the electronic device 101 may include the processor 120, the memory 130, a display 560 (e.g., at least a portion of the display device 160 of FIG. 1), and a wireless communication circuit 590 (e.g., at least a portion of the wireless communication circuit 192 of FIG. 1) in the housing 110.

According to an embodiment, the display 560 may display an AR emoji. The electronic device 101 may recognize an appearance of a user (e.g., at least one of his/her face, his/her body, or an accessory that the user wears) by using a camera (e.g., at least a portion of the camera module 180 of FIG. 1) and may generate a three-dimensional AR emoji (e.g., a first AR emoji 610 of FIG. 6) based on the recognized appearance of the user. For example, the electronic device 101 can use a camera to observe the user's face, biometrics to determine their bio-data, microphone to determine voice pitch, and compare against data of the user with different known appearances and thus determine the mood or emotional state of the user. According to an embodiment, the display 560 may receive and display a first stroke input. The first stroke input may include, for example, at least one of a stroke input using the digital pen 201 or a stroke input using a body portion of the user (e.g., a finger, a knuckle, a nail, or the like of the user).

According to an embodiment, the wireless communication circuit 590 may perform wireless communication with an external electronic device (e.g., the first electronic device 102, the second electronic device 104, or the server 108 illustrated in FIG. 1) based on a wireless communication protocol.

According to an embodiment, the memory 130 may store a data base (DB) associated with an AR emoji. The data base associated with the AR emoji may include, for example, at least one or a combination of a gesture image indicating a gesture of an AR emoji, a sticker image, or a background image. According to another embodiment, the memory 130 might not store the data base associated with the AR emoji, and the electronic device 101 may receive the data base associated with the AR emoji from an external server (e.g., the server 108 of FIG. 1). According to an embodiment, the memory 130 may store instructions executable by the processor 120 for the purpose of displaying an AR emoji.

Augmented Reality Emojis

According to an embodiment, the processor 120 may be operatively connected with the display 560 and the memory 130. The processor 120 may perform overall functions of the electronic device 101 for displaying an AR emoji indicating a gesture. For example, the electronic device 101 may display an AR emoji indicating a gesture through the display 560, based on the first stroke input received on the display 560. For example, the processor 120 may retrieve an AR emoji indicating a gesture from the memory 130 by comparing a position and a shape of the received first stroke input with the data base for the AR emoji stored in the memory 130. According to an embodiment, the processor 120 may further retrieve at least one of a sticker image or a background image, as well as the AR emoji indicating the gesture, based on the position and shape of the received first stroke input. A sticker image can be an object that can be placed to appear to interact with the AR emoji. Thus, although the AR emoji and the sticker image may be separate, when appearing together, in certain embodiments, the AR emoji and sticker, can simulate the appearance of one picture. The processor 120 may generate an image file by composing at least one of the AR emoji indicating the gesture, the sticker image, or the background image. The image file may be, for example, a dynamic image (e.g., gif, jpg, png, avi, or gif) or may be a still image. The dynamic image may include, for example, an animated image capable of being reproduced repeatedly. The processor 120 may store the image file in the memory 130. When the user of the electronic device 101 selects an input of transmitting an AR emoji, the processor 120 may transmit the image file to the external electronic device through the wireless communication circuit 590.

Figure 6:
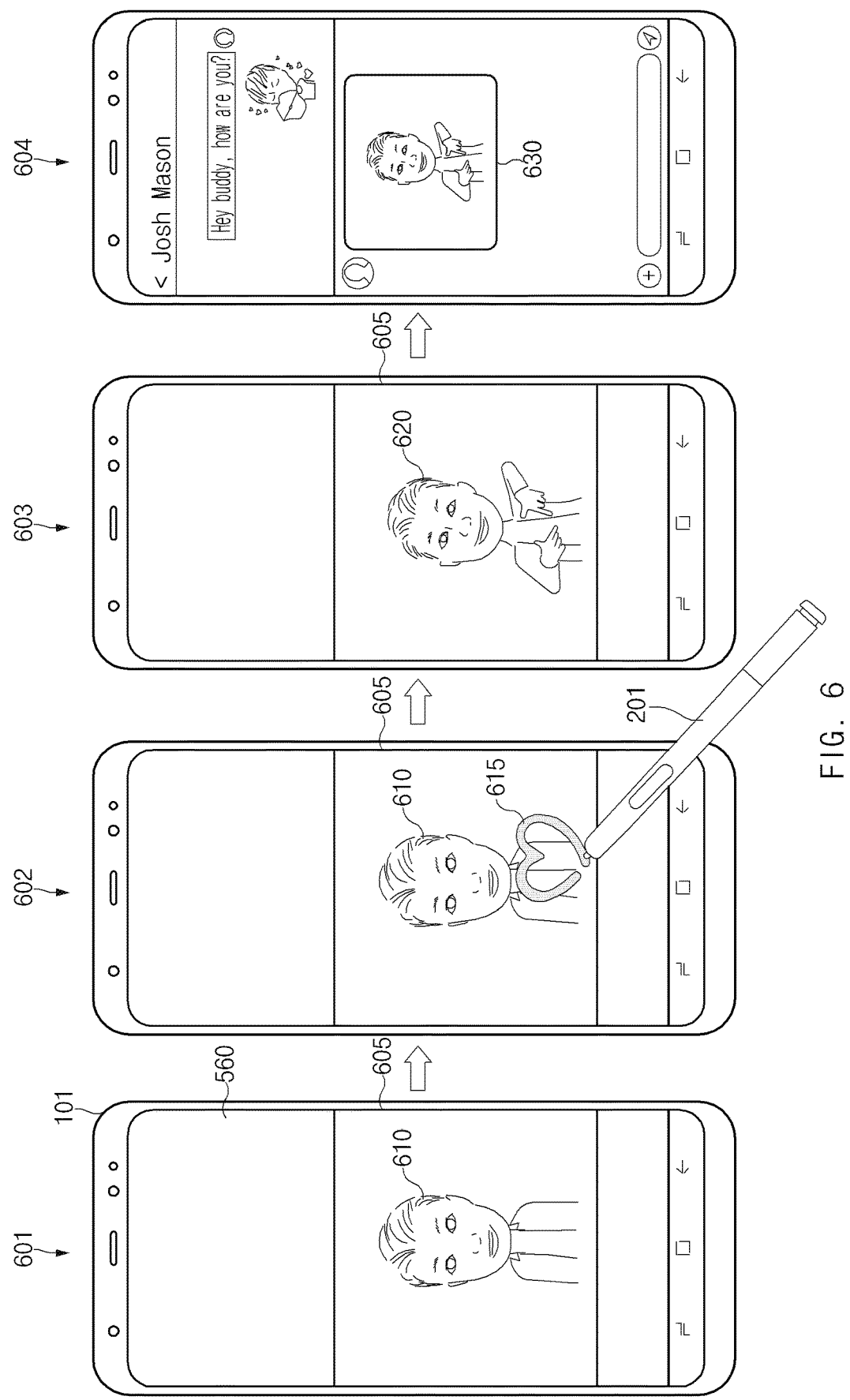
FIG. 6 illustrates an operation of an electronic device generating an AR emoji indicating a gesture based on a first stroke input, according to certain embodiments.

FIG. 6 illustrates an operation of the electronic device 101 generating an AR emoji 620 indicating a gesture based on a first stroke input 615, according to certain embodiments. The operation of the electronic device 101 displays a first AR emoji 610 at 601. The first AR emoji 610 can provide reference for a user stroke input (either via a digital pen 201 or finger trace) 615 received during operation 602, which causes the electronic device to display a second AR emoji 602 based on the location and shape of the stroke input during operation 603. In operation 604, the second emoji can transmitted, such as part of a SMS/MMS text.

Referring to FIG. 6, in operation 601, the electronic device 101 may display the first AR emoji 610 on a window 605 displayed in a partial area of the display 560. According to an embodiment, the window 605 may mean an area capable of receiving at least one stroke input.

According to an embodiment, the first AR emoji 610 may mean an AR emoji that is provided before the electronic device 101 receives the first stroke input. For example, the first AR emoji 610 may have neutral emotion (no particularly discernable emotion), action (for example, standing with the hands to the sides), or gesture (hand to the sides and relaxed). The first AR emoji 610 may be referred to as a "prototype or basic AR emoji of an AR emoji".

In operation 602, the electronic device 101 may receive at least one first stroke input 615 on the window 605 while the first AR emoji 610 is displayed. According to an embodiment, the first stroke input 615 may include a consecutive stroke input. FIG. 6 illustrates at least one first stroke input 615 received from the digital pen 201. According to another embodiment, the electronic device 101 may receive at least one first stroke input from a body portion (e.g., a finger, a knuckle, or a nail) of the user.

In operation 603, the electronic device 101 may display the second AR emoji 620 indicating a gesture on the window 605, based on the position and shape of the first stroke input 615. For example, when the shape of the first stroke input 615 indicates a heart shape and the position of the first stroke input 615 corresponds to a chest position of the first AR emoji 610, the electronic device 101 may display the second AR emoji 620 indicating a gesture of expressing a heart with hands in front of the chest.

According to an embodiment, the electronic device 101 may generate the second AR emoji 620 based on the data base for the AR emoji stored in the memory 130. According to another embodiment, the data base associated with the AR emoji may be stored in an external server (e.g., the server 108 of FIG. 1) for the purpose of increasing the efficiency of space of the memory 130 in the electronic device 101. In this case, the electronic device 101 may transmit information about the first stroke input 615 (e.g., information indicating at least one of a shape or a position of the first stroke input 615) to the external server 108, and the external server 108 may generate the second AR emoji 620 based on the information about the first stroke input 615. The external server 108 may transmit the information about the second AR emoji 620 to the electronic device 101.

In operation 604, the electronic device 101 may transmit the second AR emoji 620 to an external electronic device (e.g., the first electronic device 102 or the second electronic device 104 of FIG. 1). For example, the electronic device 101 may receive a user input of transmitting the second AR emoji 620 in a state where a function (or an application) associated with transmitting a message is executed. The electronic device 101 may generate an image file 630 including the second AR emoji 620 in response to the user input. The image file 630 may be, for example, a dynamic image (e.g., gif, jpg, png, avi, or gif) in which there is repeatedly performed an operation where an AR emoji performs a gesture (e.g., a gesture of expressing a heart with hands in front of a chest) or may be a still image that is obtained by capturing a portion of the dynamic image. The electronic device 101 may transmit the generated image file 630 to the external electronic device.

Figure 7:
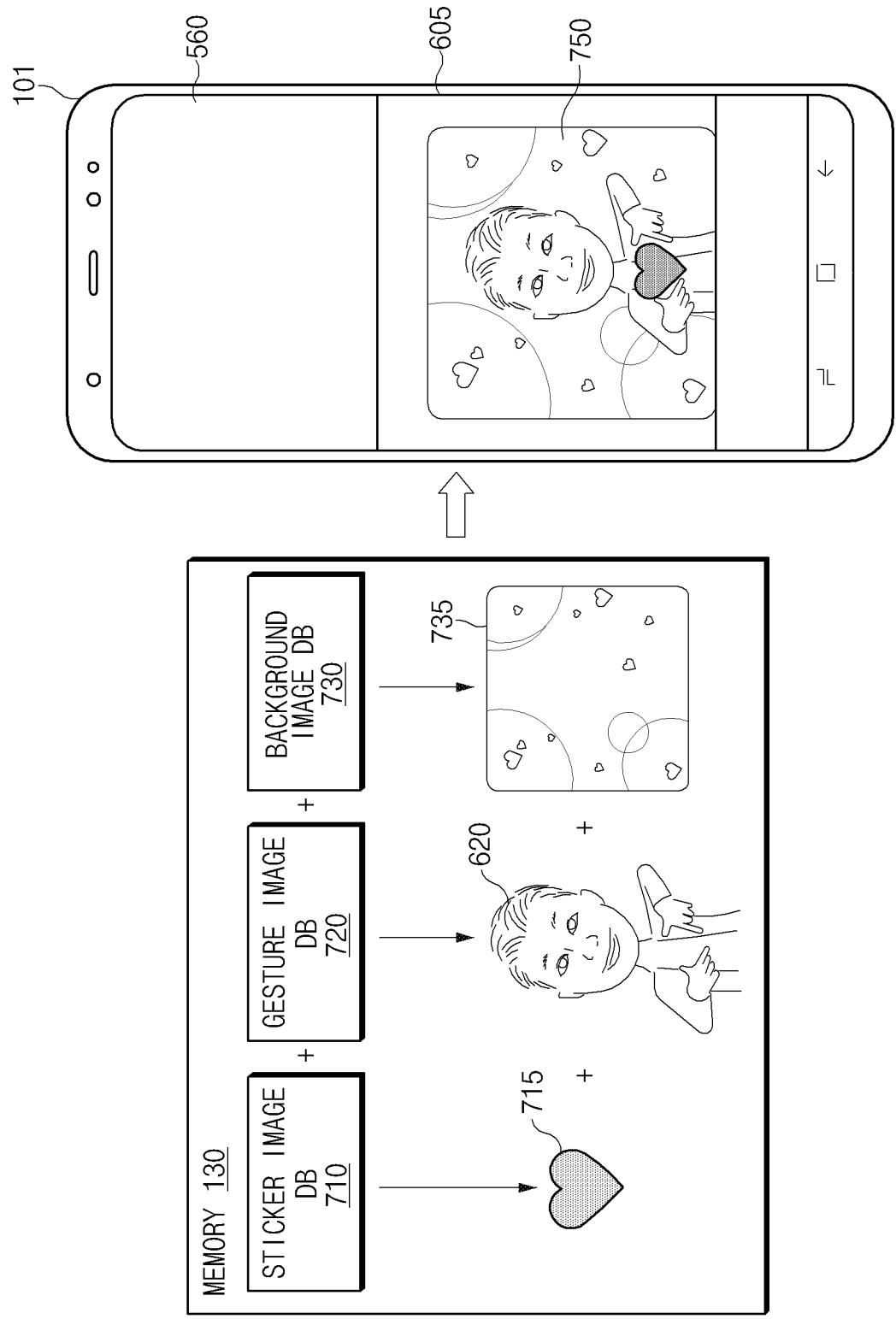
FIG. 7 illustrates an AR emoji in which a sticker image and a background image are composed, according to certain embodiments.

FIG. 7 illustrates an AR emoji 750 in which a sticker image 715 and a background image 735 are composed, according to certain embodiments. FIG. 7 illustrates an embodiment where a data base (e.g., 710, 720, and 730) associated with an AR emoji is stored in the memory 130 of the electronic device 101, but the disclosure may be applied to an embodiment where a data base associated with an AR emoji is stored in an external server.

Referring to FIG. 7, the data base associated with the AR emoji may include a sticker image data base (DB) 710, a gesture image data base (DB) 720, and a background image data base (DB) 730. The electronic device 101 may further display at least one of the sticker image 715 or the background image 735, as well as the second AR emoji 620, based on the data base associated with the AR emoji.

The sticker image data base (DB) 710, a gesture image data base (DB) 720, and a background image data base (DB) 730 can be indexed by location of the stroke input, and shape of the stroke input. For example, the location can be relative to the first emoji 610 (head, face, eyes, nose, mouth, ears, arm, hand, chest/torso). The shape can be heart, certain predetermined written words ("hello", "hi", "OMG", etc.).

Tables 1-3 indicate the selected sticker, gesture, and background image that are used, based on the location and shape of the first stroke input:

TABLE 1

| | | Sticker | | | | |
|---|---|---|---|---|---|---|
| Shape: | Location: | Head | Face | Arm | Chest | Hand |
| Heart | | | | | Solid heart | |
| Hand | | | | "Hello" | | |

TABLE 2

| | | $2^{nd}$ Emoji Gesture | | | | |
|---|---|---|---|---|---|---|
| Shape: | Location: | Head | Face | Arm | Chest | Hand |
| Heart | | | | | Hands holding an object | |
| Hand | | | | Wave | | |

TABLE 3

| | | Background | | | | |
|---|---|---|---|---|---|---|
| Shape: | Location: | Head | Face | Arm | Chest | Hand |
| Heart | | | | | Romantic | |
| Hand | | | | Clouds | | |

For example, when the first stroke input (e.g., 615 of FIG. 1) indicates a heart shape, the electronic device 101 may retrieve the sticker image 715 of the heart shape from the sticker image data base 710. For another example, the electronic device 101 may retrieve the background image 735 including a heart shape or indicating a romantic mode from the background image data base 730, based on the first stroke input 615 indicating the heart shape. For another example, because the position of the first stroke input 615 indicating the heart shape corresponds to a position of a chest of a first AR emoji (e.g., 610 of FIG. 6), the electronic device 101 may retrieve the second AR emoji 620 indicating a gesture of expressing a heart with hands in front of the chest from the gesture image data base 720.

According to an embodiment, the electronic device 101 may display the AR emoji 750, which is generated by composing the second AR emoji 620, the sticker image 715, and the background image 735, on the window 605. When a user input of transmitting the composed AR emoji 750 is received in a state where the composed AR emoji 750 is displayed, the electronic device 101 may generate an image file (not illustrated) including the composed AR emoji 750. The image file may be a dynamic image in which there are repeatedly performed an operation in which an AR emoji (e.g., 620) performs a specific gesture (e.g., a gesture of expressing a heart with hands in front of a chest) and an operation in which at least one of the sticker image 715 or the background image 735 moves. For another example, the image file may be a still image that is obtained by capturing a portion of the dynamic image. The electronic device 101 may transmit the generated image file to the external electronic device.

Figure 8:
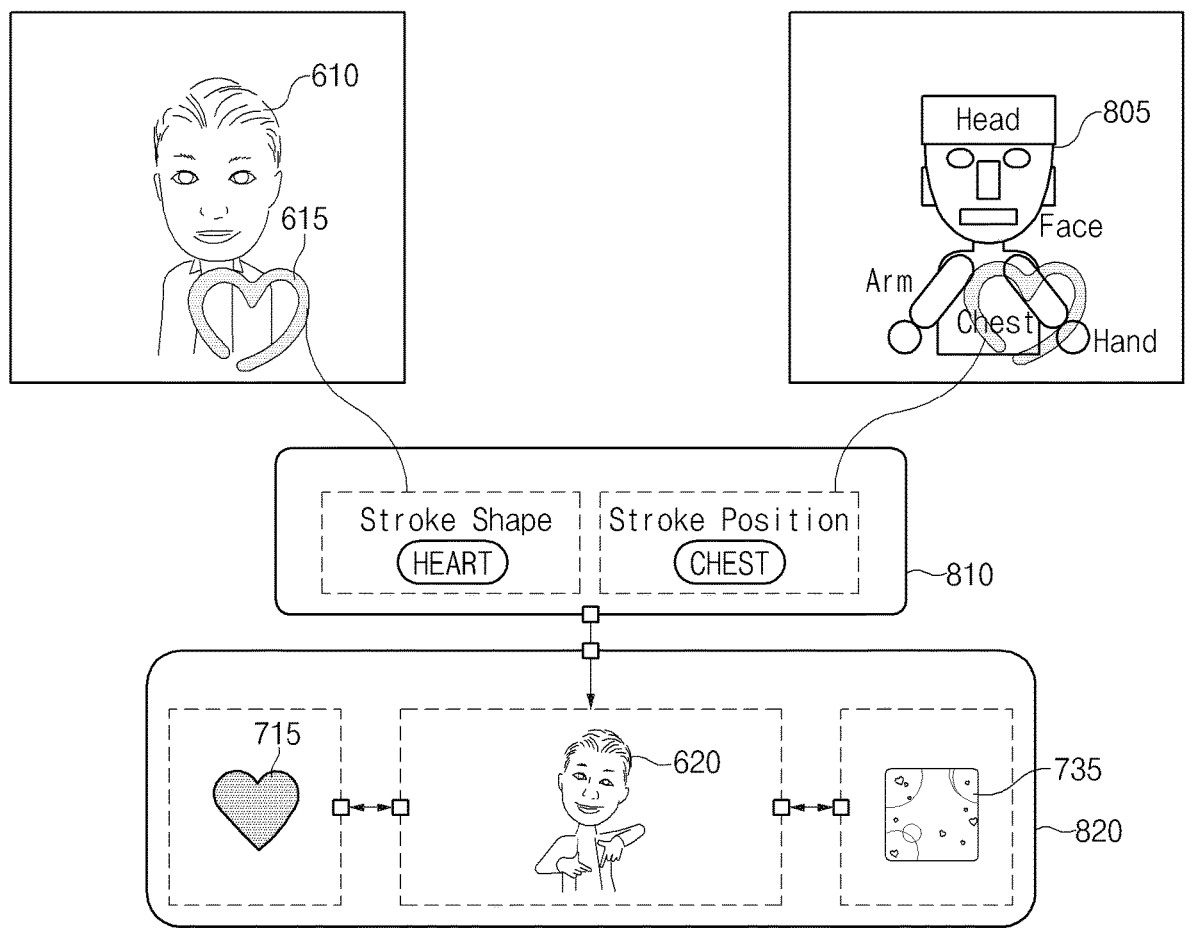
FIG. 8 illustrates an operation of an electronic device generating an AR emoji based on a first stroke input, according to certain embodiments.

FIG. 8 illustrates an operation of the electronic device 101 generating an AR emoji (e.g., 750 of FIG. 7) based on the first stroke input 615, according to certain embodiments. FIG. 8 illustrates an embodiment of retrieving the sticker image 715, the background image 735, and the second AR emoji 620, but the disclosure may be identically applied to an embodiment of retrieving only the second AR emoji 620.

Referring to FIG. 8, in operation 810, the electronic device 101 may determine a shape and a position of the first stroke input 615 received on a window (e.g., 605 of FIG. 6). For example, the electronic device 101 may identify that the position of the first stroke input 615 corresponds to the position of the chest, by comparing a reference area including an area corresponding to each body (e.g., a head, a face, an arm, a chest, or a hand) of the first AR emoji 610 with the position of the received first stroke input 615. For another example, the electronic device 101 may identify that the shape of the first stroke input 615 corresponds to a heart shape.

In operation 820, the electronic device 101 may retrieve the sticker image 715 of the heart shape, the second AR emoji 620 indicating a gesture of expressing a heart with hands in front of a chest, and the background image 735 including a heart shape from the data base associated with the AR emoji, based on the identified shape and position of the first stroke input 615. In certain embodiments, if the heart shape was drawn over the face, the stick may include enlarged lips making a kissing gesture. If the heart shape was drawn on one of the arms or hands, the sticker may be a tattoo on the arm.

Although not illustrated in FIG. 8, the electronic device 101 may generate an image file by composing the sticker image 715 of the heart shape, the second AR emoji 620 indicating the gesture, and the background image 735 including the heart shape.

Figure 9:
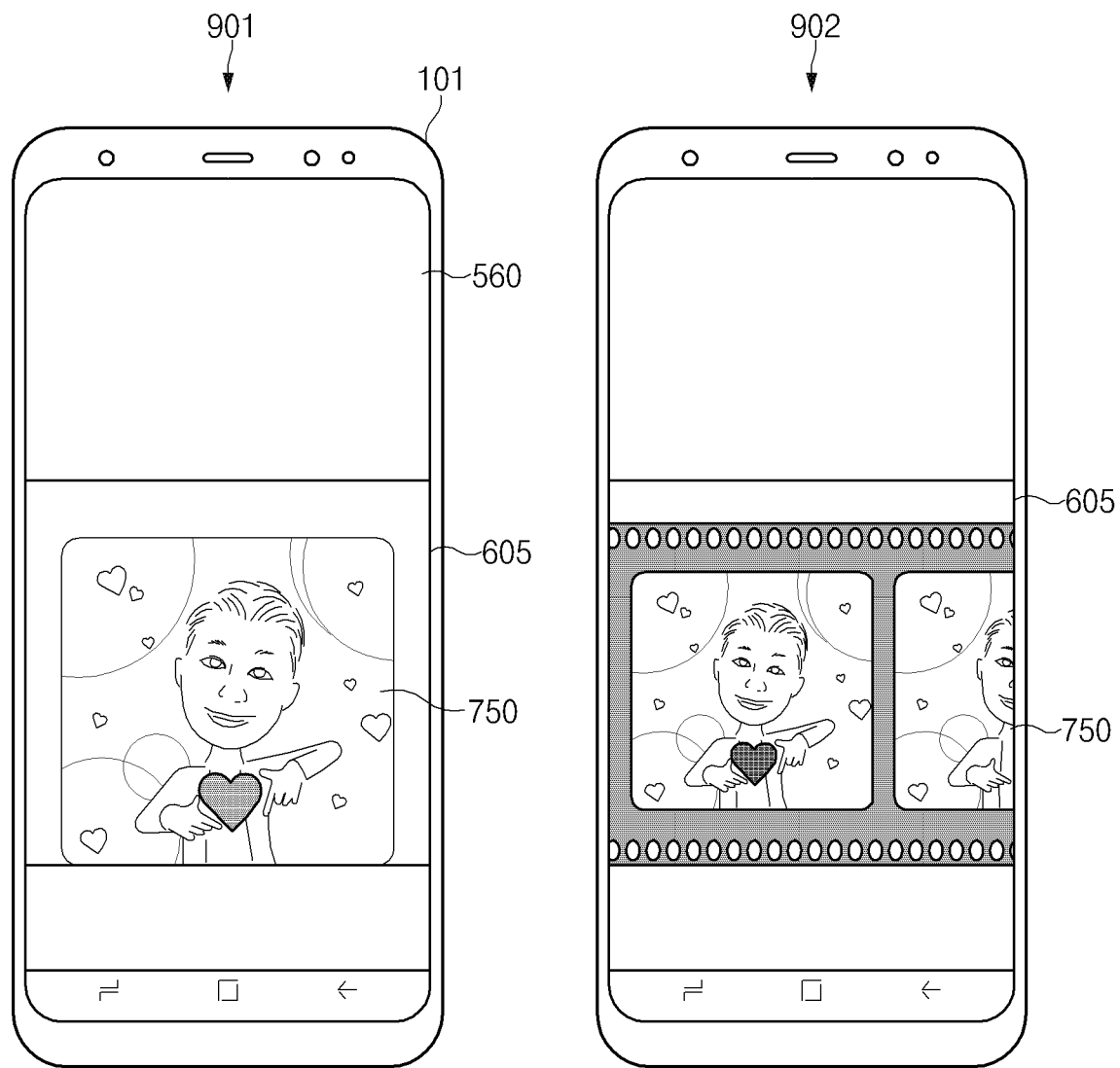
FIG. 9 illustrates an operation of an electronic device determining a type of an composed AR emoji, according to certain embodiments.

FIG. 9 illustrates an operation of the electronic device 101 determining a type of the composed AR emoji 750, according to certain embodiments.

Referring to FIG. 9, the electronic device 101 may determine an image type of the composed AR emoji 750. The image type may include an animation type in which the composed AR emoji 750 dynamically moves, and a still type in which the composed AR emoji 750 does not move.

According to an embodiment, the electronic device 101 may determine an image type of the AR emoji 750, based on an image type of components of the AR emoji 750, which are retrieved from the memory 130. For example, when an image type of the sticker image 715 of the heart shape, the second AR emoji 620 indicating the gesture of expressing a heart with hands in front of a chest, and the background image 735 including the heart shape is a still type, the electronic device 101 may display the AR emoji 750, which does not move, on the window 605 as illustrated in operation 901. For another example, when an image type of at least one of the sticker image 715 of the heart shape, the second AR emoji 620 indicating the gesture of expressing a heart with hands in front of a chest, or the background image 735 including the heart shape is an animation type, the electronic device 101 may display the AR emoji 750, which dynamically moves, on the window 605 as illustrated in operation 902. When a user input of transmitting the AR emoji 750 is received while the AR emoji 750 is displayed, the electronic device 101 may generate an image file in a file format (e.g., a dynamic image or a still image) corresponding to the image type of the AR emoji 750.

According to another embodiment, the electronic device 101 may set a default of the image type of the AR emoji 750 to an animation type. In this case, the electronic device 101 may capture an image depending on a user input received while the AR emoji 750 displayed on the display 560 moves. The electronic device 101 may transmit the captured image file to the external electronic device.

Figure 10:
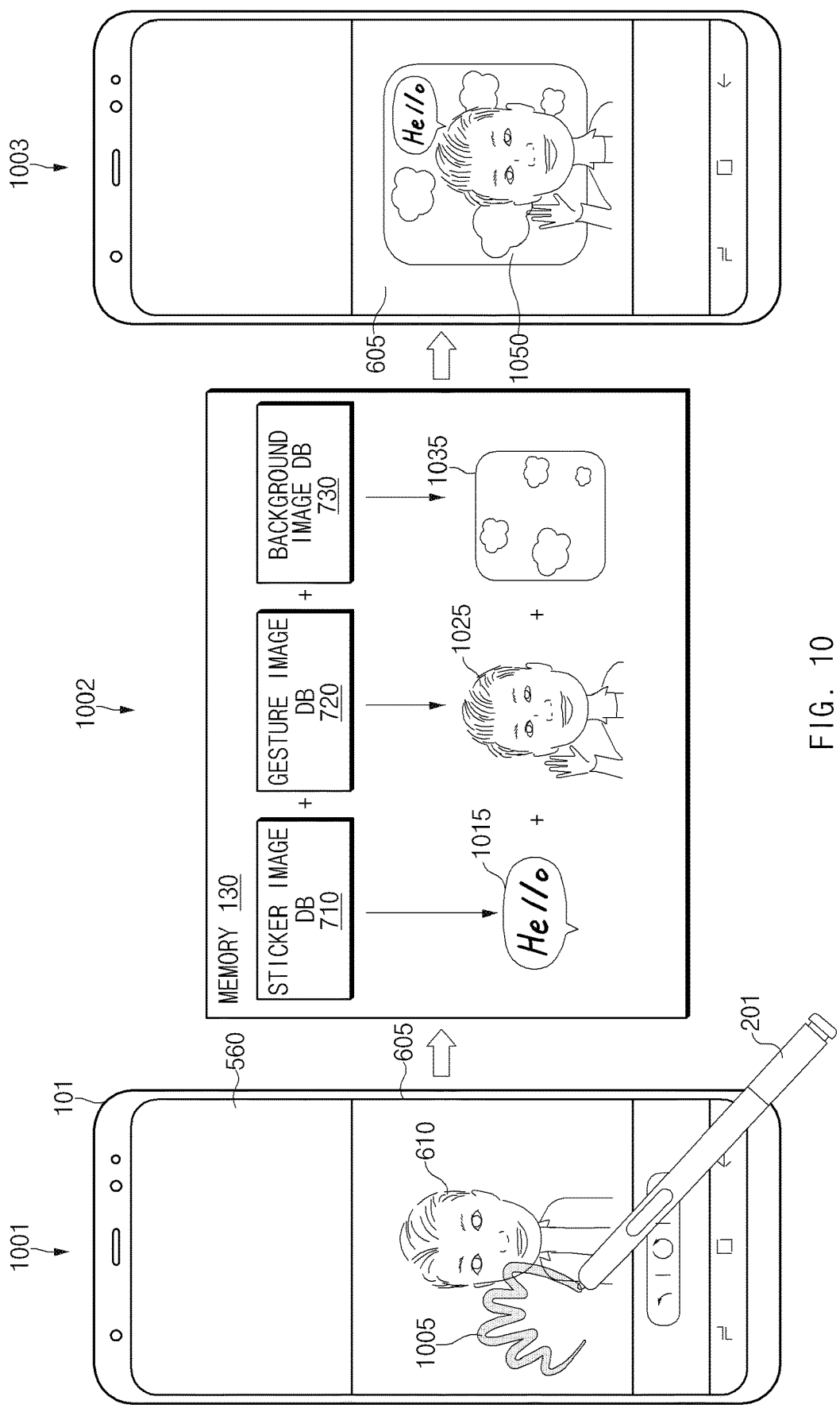
FIG. 10 illustrates another example of an AR emoji indicating a gesture based on a first stroke input.

FIG. 10 illustrates another example of an AR emoji 1050 indicating a gesture based on a first stroke input 1005. FIG. 10 illustrates an example of the AR emoji 1050 in which a sticker image 1015, a second AR emoji 1025, and a background image 1035 are composed, but the disclosure may be identically applied to an example in which only the second AR emoji 1025 is displayed.

Referring to FIG. 10, in operation 1001, the electronic device 101 may receive at least one first stroke input 1005 while the first AR emoji 610 is displayed on the window 605.

In operation 1002, the electronic device 101 may retrieve the sticker image 1015, the second AR emoji 1025 indicating a gesture, and the background image 1035 from the memory 130, based on a shape and a position of the first stroke input 1005 thus received. For example, when the shape of the first stroke input 1005 indicates a hand shape, the electronic device 101 may retrieve the sticker image 1015 indicating a greeting (e.g., "Hello") from the sticker image data base 710. For another example, when the shape of the first stroke input 1005 indicates a hand shape, the electronic device 101 may retrieve the background image 1035 indicating a morning sky from the background image data base 730. For another example, when the first stroke input 1005 indicating a hand shape is received on a side (e.g., a right side) of a body of the first AR emoji 610, the electronic device 101 may retrieve the second AR emoji 1025 indicating a gesture of waving a hand with the hand raised, from the gesture image data base 720.

In operation 1003, the electronic device 101 may display the AR emoji 1050, in which the sticker image 1015, the second AR emoji 1025, and the background image 1035 thus retrieved are composed, on the window 605. When a user input of transmitting the composed AR emoji 1050 is received, the electronic device 101 may generate an image file (not illustrated) including the composed AR emoji 1050. The image file may be, for example, a dynamic image in which there are repeatedly performed an operation in which an AR emoji (e.g., 1025) performs a specific gesture (e.g., a gesture of waving a hand) and an operation in which at least one of the sticker image 1015 or the background image 1035 moves. For another example, the image file may be a still image that is obtained by capturing a portion of the dynamic image. The electronic device 101 may transmit the generated image file to the external electronic device.

Figure 11:
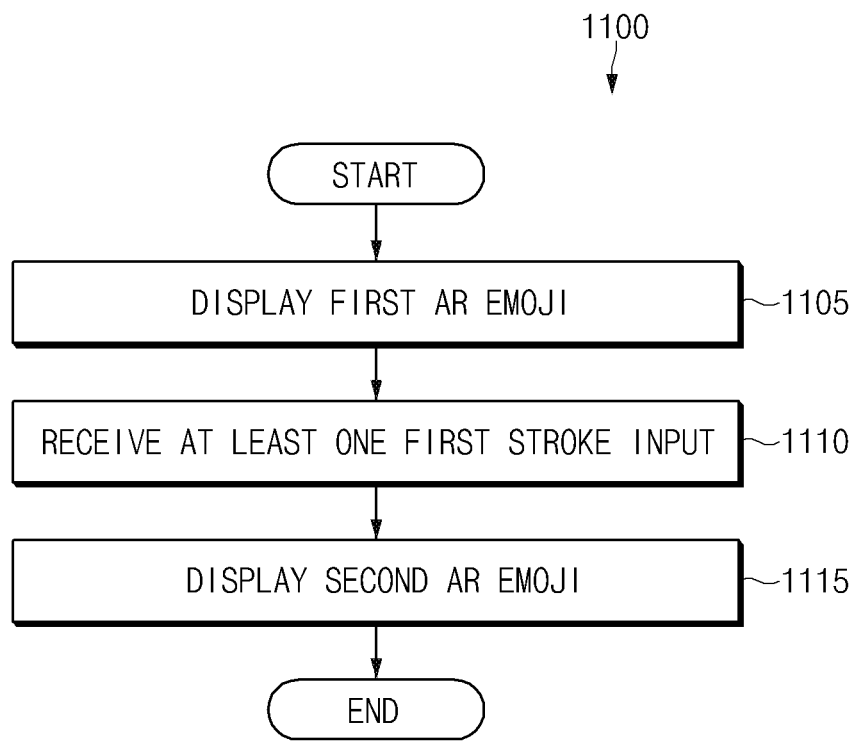
FIG. 11 illustrates an operation flowchart of an electronic device transmitting an image file including an AR emoji based on a first stroke input, according to certain embodiments.

FIG. 11 illustrates an operation flowchart 1100 of the electronic device 101 displaying an AR emoji based on a first stroke input, according to certain embodiments. Operations to be described below may be performed by the electronic device 101 or may be performed by a component (e.g., the processor 120) included in the electronic device 101.

Referring to FIG. 11, in operation 1105 of the operation flowchart 1100, the electronic device 101 may display the first AR emoji 610 on the window 605 through the display 560. According to an embodiment, the first AR emoji 610 may mean a prototype of a three-dimensional AR emoji generated based on an appearance of the user of the electronic device 101. For example, the first AR emoji 610 may not indicate an emotion, an action, or a gesture.

In operation 1110, the electronic device 101 may receive the at least one first stroke input 615 on the window 605 while the first AR emoji 610 is displayed. The at least one first stroke input 615 may be, for example, consecutive.

In operation 1115, the electronic device 101 may display the second AR emoji 620 indicating a gesture on the window 605, based on a position and a shape of the first stroke input 615 thus received.

Figure 12:
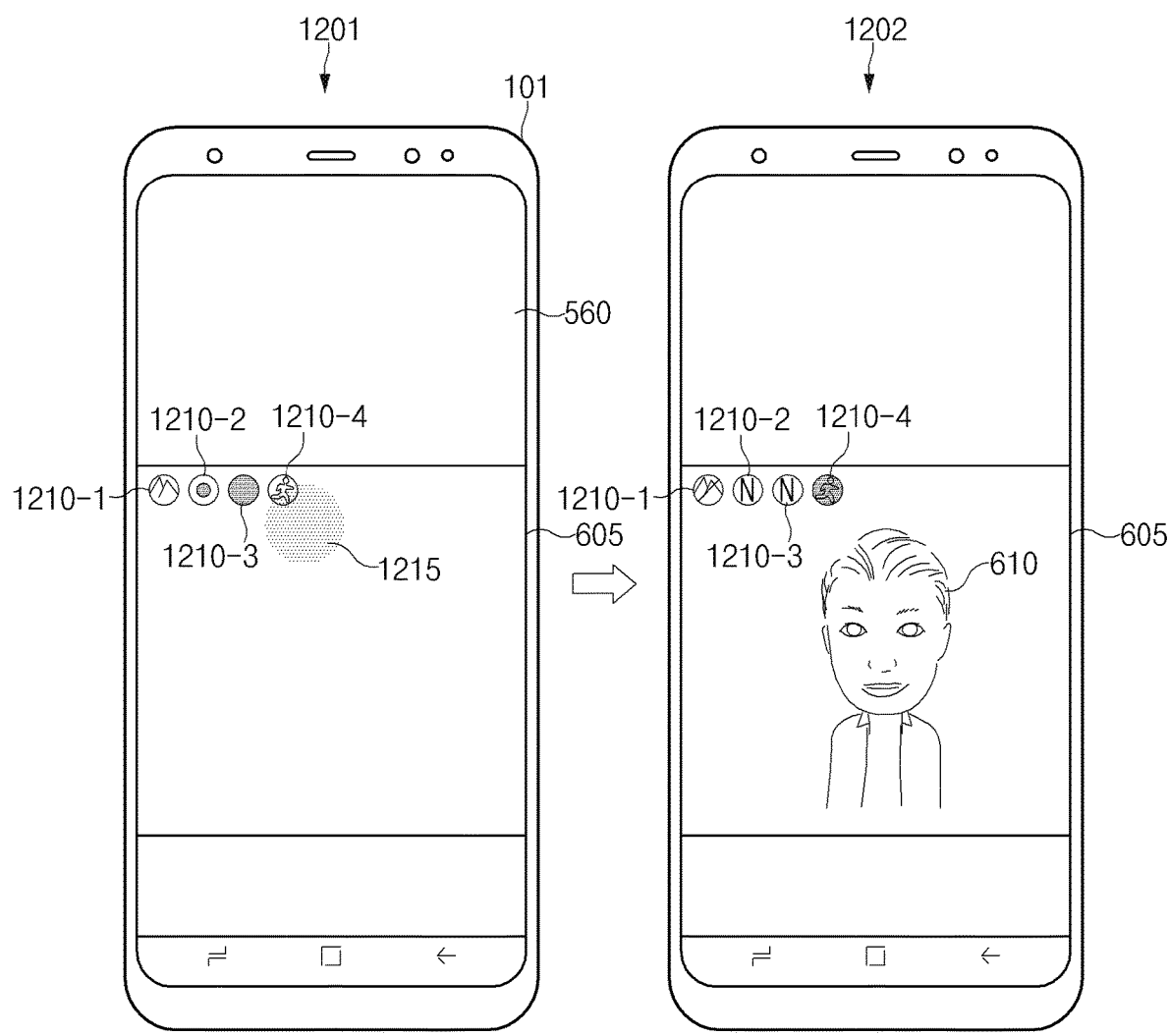
FIG. 12 illustrates an operation of an electronic device executing a function associated with transmitting a message, according to certain embodiments.

FIG. 12 illustrates an operation of the electronic device 101 executing a function associated with transmitting a message, according to certain embodiments.

Referring to FIG. 12, in operation 1201, in response to the execution of a function associated with transmitting a message, the electronic device 101 may display the window 605 on a partial area of the display 560. According to an embodiment, for example, the function associated with transmitting the message may include an application, which is capable of transmitting a message or an AR emoji, such as a short message service (SMS), a multimedia message service (MMS), or a social network service (SNS). For example, the electronic device 101 may execute the function associated with transmitting the message in response to detecting that the digital pen 201 inserted into the receiving space 112 of the electronic device 101 is detached from the receiving space 112 or may execute the function associated with transmitting the message in response to a user input.

According to an embodiment, the window 605 may mean an area capable of receiving a first stroke input (or a drawing input). The electronic device 101 may display a plurality of objects 1210-1, 1210-2, 1210-3, and 1210-4 associated with a first stroke input function on a partial area (e.g., an edge area) in the window 605 or an outer area of the window 605. FIG. 12 illustrates the four objects 1210-1, 1210-2, 1210-3, and 1210-4 associated with the first stroke input function, but the number or order of objects or positions of the objects are not limited to the example illustrated in FIG. 12. For example, the electronic device 101 may omit at least one of the plurality of objects 1210-1, 1210-2, 1210-3, and 1210-4 or may further display any other object.

According to an embodiment, the first object 1210-1 may be used to activate a function of a second stroke input. According to an embodiment, the second stroke input may mean an input of user's writing a character with handwriting or painting a drawing by using the digital pen 201 or a body portion (e.g., a finger, a knuckle, or a nail) of the user. According to an embodiment, the second object 1210-2 may be used to change the size of the second stroke input, and the third object 1210-3 may be used to change a color of the second stroke input. According to an embodiment, the fourth object 1210-4 may be used to activate an AR emoji function.

When the electronic device 101 receives a user input 1215 of selecting the fourth object 1210-4, in operation 1202, the electronic device 101 may activate the AR emoji function. When the AR emoji function is activated, the electronic device 101 may display the first AR emoji 610 on the window 605. To indicate that the AR emoji function is activated, the electronic device 101 may change a color of the fourth object 1210-4.

According to an embodiment, when the AR emoji function is activated, the electronic device 101 may deactivate the second stroke input function. To indicate that the second stroke input function is deactivated, the electronic device 101 may change shapes or colors of the first object 1210-1, the second object 1210-2, and the third object 1210-3. When the second stroke input function is deactivated and the AR emoji function is activated, the electronic device 101 may display a second AR emoji (e.g., 620 of FIG. 6 or 1025 of FIG. 10) indicating a gesture depending on a first stroke input (e.g., 615 of FIG. 6 or 1005 of FIG. 10) of the digital pen 201.

Figure 13:
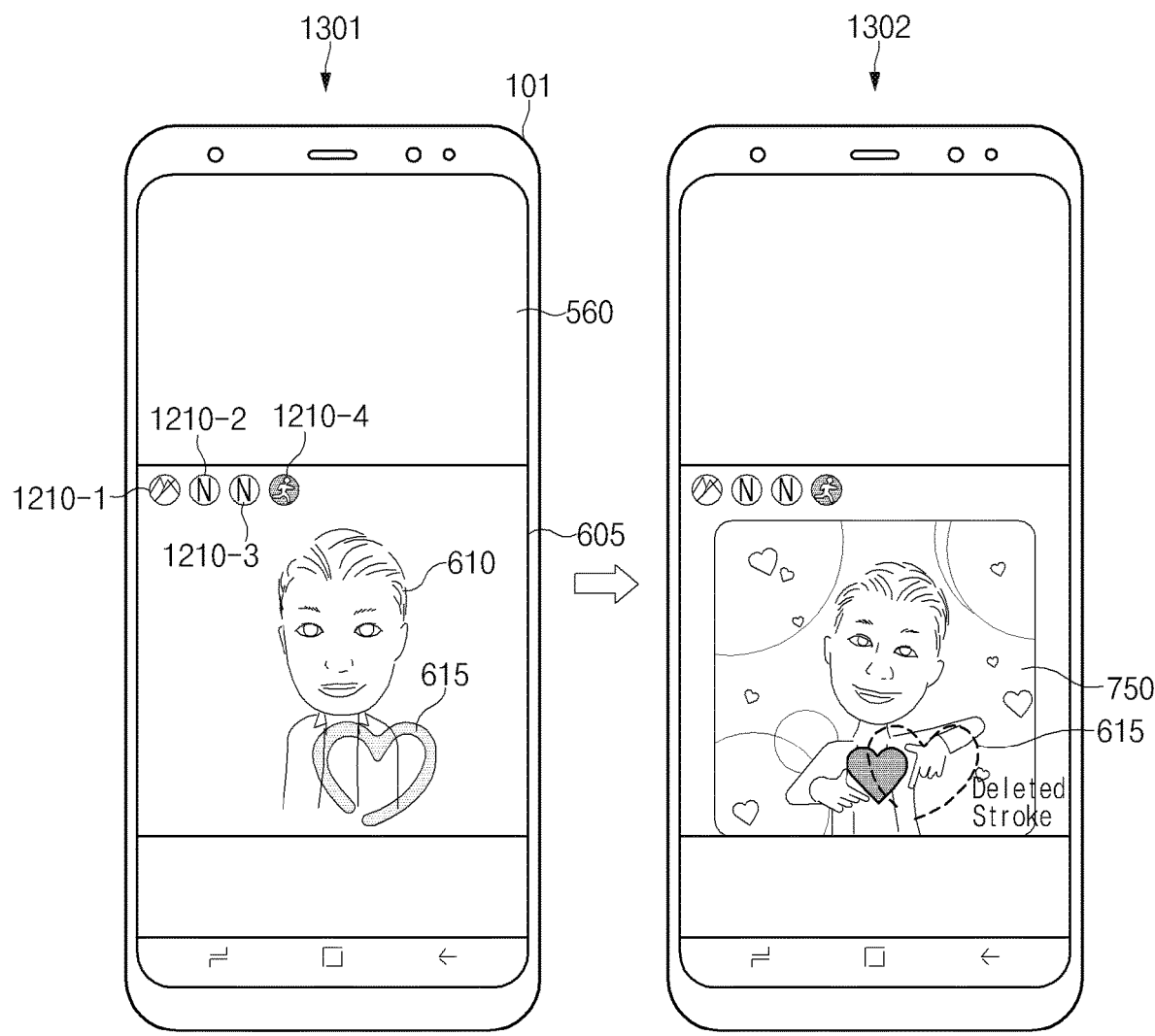
FIG. 13 illustrates an operation of an electronic device providing an effect in which an output stroke corresponding to a received first stroke input fades away, according to certain embodiments.

FIG. 13 illustrates an operation of the electronic device 101 providing an effect in which an output stroke corresponding to the received first stroke input 615 fades away (or disappears), according to certain embodiments.

Referring to FIG. 13, in operation 1301, the electronic device 101 may display the output stroke corresponding to the first stroke input 615 on the window 605 such that the user visually perceives the first stroke input 615 received on the window 605. For example, the electronic device 101 may display the output stroke while the first stroke input 615 being consecutive is received or may display the output stroke after the first stroke input 615 is completed.

According to an embodiment, the electronic device 101 may detect that the first stroke input 615 is completed. For example, when the consecutive first stroke input 615 touched on the display 560 (or a digitizer) is detached from the display 560 or when an input is not received from the digital pen 201 within a specified threshold time, the electronic device 101 may determine that the first stroke input 615 is completed.

When the first stroke input 615 is completed, in operation 1302, the electronic device 101 may display the second AR emoji 620 indicating a gesture or the AR emoji 750, in which the sticker image 715, the second AR emoji 620, and the background image 735 are composed, on the window 605. According to an embodiment, while the second AR emoji 620 or the composed AR emoji 750 is displayed, the electronic device 101 may provide an effect in which the output stroke (e.g., an output stroke corresponding to the first stroke input 615) displayed on the window 605 fades away (or disappears).

Although not illustrated in FIG. 13, while the second AR emoji 620 or the composed AR emoji 750 is displayed, the electronic device 101 may provide an effect in which the output stroke displayed on the window 605 fades away (or disappears), in response to a user input of activating the second stroke input function.

Figure 14:
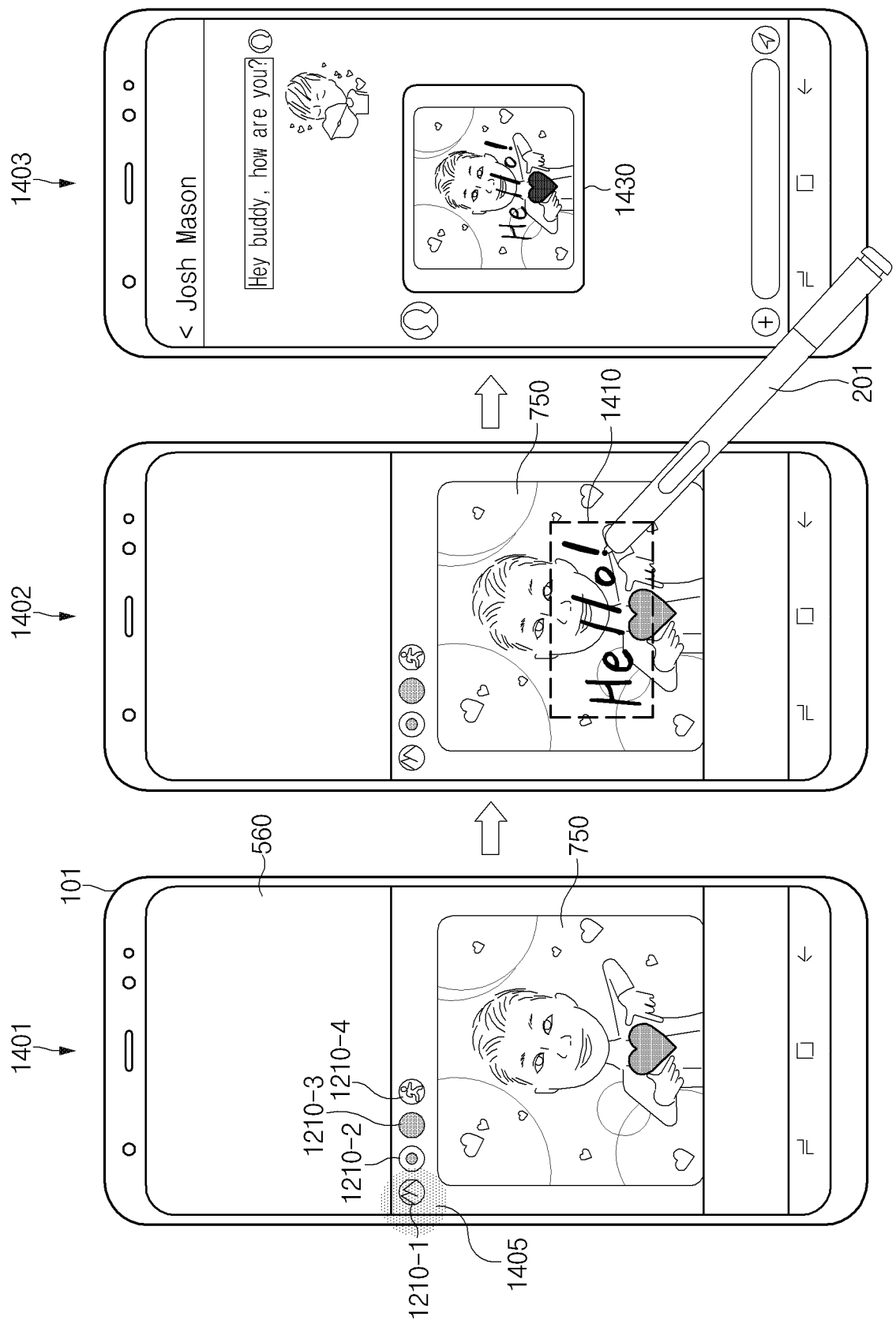
FIG. 14 illustrates an operation of an electronic device displaying a character corresponding to a second stroke input together with an AR emoji, according to certain embodiments.

FIG. 14 illustrates an operation of the electronic device 101 displaying a character corresponding to a second stroke input together with the AR emoji 750, according to certain embodiments.

Referring to FIG. 14, in operation 1401, the electronic device 101 may receive a user input 1405 of selecting the first object 1210-1 while the AR emoji 750 (or the second AR emoji 620) is displayed on the window 605. In response to the user input 1405, the electronic device 101 may activate the second stroke input function. To indicate that the second stroke input function is activated, the electronic device 101 may change shapes or colors of the first object 1210-1, the second object 1210-2, and the third object 1210-3.

In operation 1402, the electronic device 101 may receive a second stroke input 1410 of drawing a character (e.g., "Hello!) on the AR emoji 750 from the digital pen 201. The electronic device 101 may display the character corresponding to the received second stroke input 1410 so as to be placed on the AR emoji 750 (i.e., so as to overlap the AR emoji 750).

In operation 1403, the electronic device 101 may generate an image file 1430 including the AR emoji 750 and a character corresponding to the second stroke input 1410 depending on a user input and may transmit the generated image file 1430 to an external electronic device.

Figure 15:
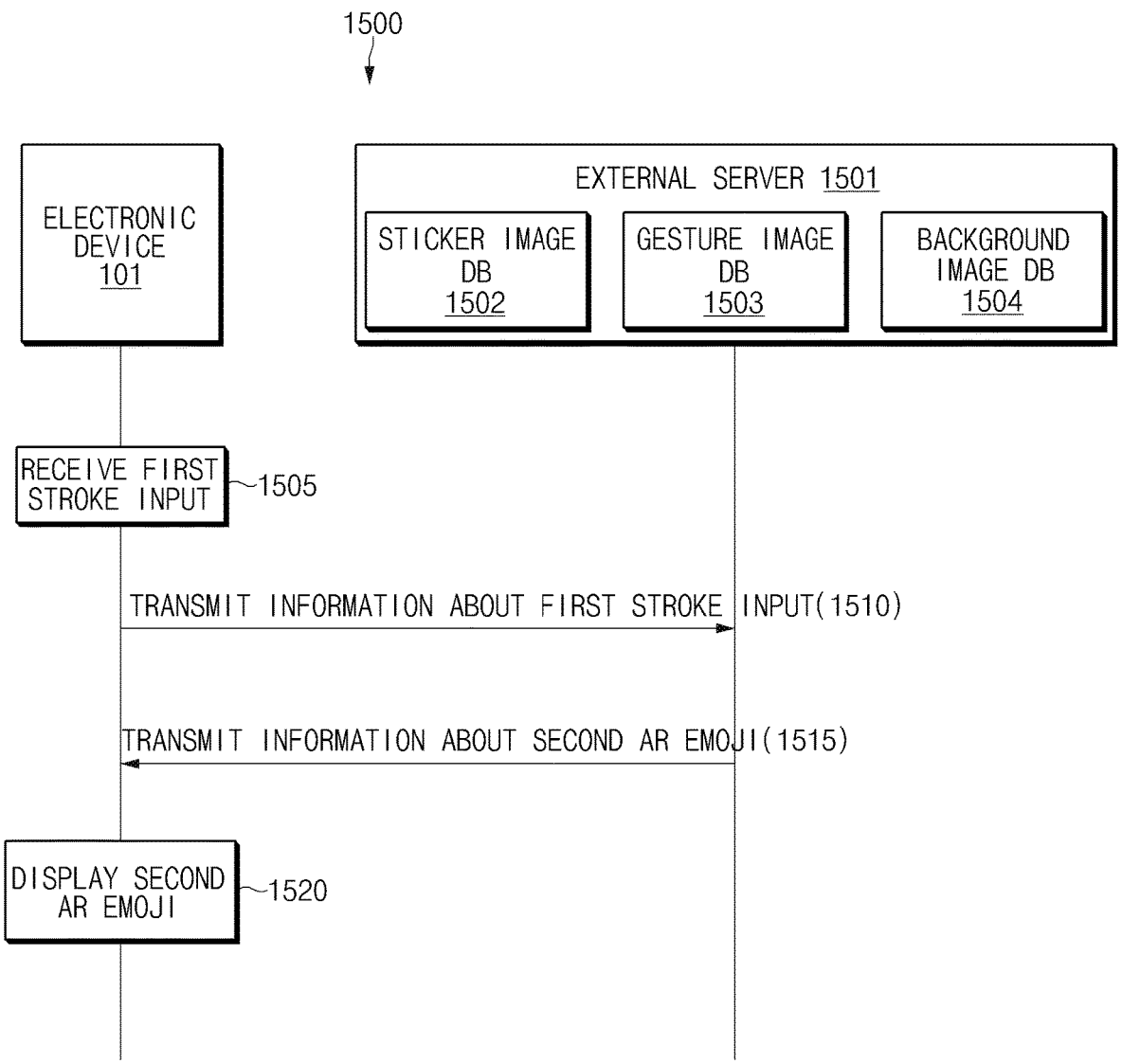
FIG. 15 illustrates a flowchart illustrating a signal flow between an electronic device and an external server transmitting information about an AR emoji, according to certain embodiments.

FIG. 15 illustrates a flowchart 1500 illustrating a signal flow between the electronic device 101 and an external server 1501 transmitting information about an AR emoji, according to certain embodiments.

Referring to FIG. 15, the external server 1501 (e.g., the server 108 of FIG. 1) may store a data base associated with an AR emoji. The data base associated with the AR emoji may include a sticker image data base 1502 (e.g., 710 of FIG. 7), a gesture image data base 1503 (e.g., 720 of FIG. 7), and a background image data base 1504 (e.g., 730 of FIG. 7). To increase an efficiency of a memory storage space, the electronic device 101 may be provided with the data base associated with the AR emoji from the external server 1501 without storing the data base.

In operation 1505, the electronic device 101 may receive a first stroke input (e.g., 615 of FIG. 6).

In operation 1510, the electronic device 101 may transmit information about the first stroke input 615 to the external server 1501. The information about the first stroke input 615 may indicate, for example, a shape and a position of the first stroke input 615.

In operation 1515, the external server 1501 may transmit information about the second AR emoji 620 to the electronic device 101. According to another embodiment, the external server 1501 may transmit, to the electronic device 101, the sticker image 715 and the background image 735 as well as the second AR emoji 620. According to an embodiment, in the case where the external server 1501 generates the composed AR emoji 750, the external server 1501 may transmit the composed AR emoji 750 to the electronic device 101. According to another embodiment, in the case where the electronic device 101 generates the composed AR emoji 750, the external server 1501 may transmit information associated with the sticker image 715, the second AR emoji 620, and the background image 735. In this case, the electronic device 101 may generate the composed AR emoji 750 based on the received information.

In operation 1520, the electronic device 101 may display the second AR emoji (or the composed AR emoji 750) through the display 560 (e.g., operation 603 of FIG. 6).

As described above, an electronic device (e.g., 101 of FIG. 1) may include a housing (e.g., 110 of FIG. 2), a touchscreen display (e.g., 160 of FIG. 1) that is viewable through a portion of the housing, a processor (e.g., 120 of FIG. 1) that is placed inside the housing and is operatively connected with the touchscreen display, and a memory (e.g., 130 of FIG. 1) that is placed within the housing and is operatively connected with the processor, and the memory may store instructions that, when executed, cause the processor to display a first augmented reality (AR) emoji on a window capable of receiving at least one first stroke input, through the touchscreen display, to receive the at least one first stroke input while displaying the first AR emoji on the window, and to display a second AR emoji, based at least partially on a position and a shape of the at least one first stroke input thus received.

According to an embodiment, the first AR emoji may not include a gesture, and the second AR emoji may include a gesture corresponding to the position and the shape of the at least one first stroke input.

According to an embodiment, the instructions may cause the processor to further display at least one of a sticker image or a background image corresponding to the shape of the received at least one first stroke input on the window.

According to an embodiment, the electronic device may further include a wireless communication circuit (e.g., 192 of FIG. 1) that communicates with an external electronic device, and the instructions may cause the processor to receive a first user input for transmitting the second AR emoji while at least one of the second AR emoji, the sticker image, or the background image is displayed, to generate a first image file including at least one of the second AR emoji, the sticker image, or the background image in response to the received first user input, and to transmit the generated first image file to the external electronic device, through the wireless communication circuit.

According to an embodiment, the instructions may cause the processor to receive a second stroke input while at least one of the second AR emoji, the sticker image, or the background image is displayed, to display a character corresponding to the second stroke input on the window, through the touchscreen display, to receive the first user input while the character is displayed, to generate a second image file including at least one of the second AR emoji, the displayed character, the sticker image, or the background image in response to the received first user input, and to transmit the generated second image file to the external electronic device, through the wireless communication circuit.

According to an embodiment, the instructions may cause the processor to transmit first information about the received at least one first stroke input to the external server, through the wireless communication circuit, to receive second information about the second AR emoji from the external server, through the wireless communication circuit, based at least partially on the transmitted first information, and to display the second AR emoji through the display, based at least partially on the received second information.

According to an embodiment, the instructions may cause the processor to receive a second user input of executing a function associated with transmitting a message, to display the window, through the touchscreen display, in response to the received second user input, to display an object for executing an AR emoji function on a partial area of the window, through the touchscreen display, and to display the first AR emoji on the window, in response to a third user input of selecting the displayed object.

According to an embodiment, the instructions may cause the processor to display an output stroke corresponding to the at least first stroke input on the window while the at least one first stroke input is received, to display the second AR emoji in response to detecting that the at least one first stroke input is completed, and to allow the displayed output stroke on the window to fade away.

As described above, a method of an electronic device may include displaying a first AR emoji on a window capable of receiving at least one first stroke input, receiving the at least one first stroke input on the window, and displaying a second AR emoji, based at least partially on a position and a shape of the at least one first stroke input thus received.

According to an embodiment, the first AR emoji may not include a gesture, and the second AR emoji may include a gesture corresponding to the position and the shape of the at least one first stroke input.

According to an embodiment, the displaying of the second AR emoji may include further displaying at least one of a sticker image or a background image corresponding to the shape of the received at least one first stroke input on the window.

According to an embodiment, the method may further include receiving a first user input for transmitting the second AR emoji while at least one of the second AR emoji, the sticker image, or the background image is displayed, generating a first image file including at least one of the second AR emoji, the sticker image, or the background image in response to the received first user input, and transmitting the generated first image file to an external electronic device.

According to an embodiment, the method may further include receiving a second stroke input while at least one of the second AR emoji, the sticker image, or the background image is displayed, displaying a character corresponding to the second stroke input on the window, receiving the first user input while the character is displayed, generating a second image file including at least one of the second AR emoji, the displayed character, the sticker image, or the background image in response to the received first user input, and transmitting the generated second image file to the external electronic device.

According to an embodiment, the method may further include transmitting first information about the received at least one first stroke input to the external server, and receiving second information about the second AR emoji, from the external server, and the displaying of the second AR emoji may include displaying the second AR emoji based at least partially on the received second information.

According to an embodiment, the method may further include receiving a second user input of executing a function associated with transmitting a message, and displaying the window and an object for executing an AR emoji function on a partial area of the window, in response to the received second user input, and the displaying of the first AR emoji may include displaying the first AR emoji on the window, in response to a third user input of selecting the displayed object.

As described above, an electronic device (e.g., 101 of FIG. 1) may include a housing (e.g., 110 of FIG. 2), a touchscreen display (e.g., 160 of FIG. 1) that is viewable through a portion of the housing, a wireless communication circuit (e.g., 192 of FIG. 1) that is placed within the housing and communicates with an external server, a processor (e.g., 120 of FIG. 1) that is placed within the housing and is operatively connected with the display and the wireless communication circuit, and a memory (e.g., 130 of FIG. 1) that is placed within the housing and is operatively connected with the processor, and the memory may store instructions that, when executed, cause the processor to display a first augmented reality (AR) emoji not indicating a gesture on a window capable of receiving at least one first stroke input, through the display, to receive the at least one first stroke input while displaying the first AR emoji on the window, to transmit information about the at least one first stroke input to the external server, through the wireless communication circuit, to receive information about a second AR emoji indicating a gesture corresponding to the at least one first stroke input from the external server, through the wireless communication circuit, to display the second AR emoji, through the display, based at least partially on information about the received second AR emoji, to receive a first user input for transmitting the second AR emoji while the second AR emoji is displayed, to generate a first image file including the second AR emoji in response to the received first user input, and to transmit the generated first image file to an external electronic device, through the wireless communication circuit.

According to an embodiment, the instructions may cause the processor to receive a second user input of executing a function associated with transmitting a message, to display the window, through the display, in response to the received second user input, to display an object for executing an AR emoji function on a partial area of the window, through the display, and to display the first AR emoji on the window, in response to a third user input of selecting the displayed object.

According to an embodiment, the at least one first stroke input may include a first stroke input using a digital pen.

According to an embodiment, the instructions may cause the processor to display an output stroke corresponding to the at least first stroke input on the window while the at least one first stroke input is received, to display the second AR emoji in response to detecting that the at least one first stroke input is completed, and to allow the displayed output stroke on the window to fade away.

According to an embodiment, the instructions may cause the processor to receive a second user input while the second AR emoji is displayed, to display a character corresponding to the received second stroke input on the window, through the display, to generate a second image file including the second AR emoji and the displayed character in response to the received first user input, and to transmit the generated second image file to the external electronic device, through the wireless communication circuit.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to embodiments of the disclosure, an electronic device may generate an AR emoji indicating a gesture depending on a stroke input, thus reducing a time necessary for a user to select the AR emoji and providing a unique AR image of the user.

According to embodiments of the disclosure, the electronic device may share information about an AR emoji with an external server, thus improving a memory efficiency of the electronic device.

Besides, a variety of effects directly or indirectly understood through this disclosure may be provided.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a touchscreen display viewable through a portion of the housing;
   at least one processor disposed inside the housing and operatively connected with the touchscreen display; and
   a memory disposed within the housing and operatively connected with the at least one processor, wherein the memory stores instructions that, when executed, cause the at least one processor to perform a plurality of operations, the plurality of operations comprising:
      displaying a first augmented reality (AR) emoji on a window capable of receiving at least one first stroke input, through the touchscreen display;
      receiving the at least one first stroke input while displaying the first AR emoji on the window;
      displaying a second AR emoji, based at least partially on a position and a shape of the at least one first stroke input; and
      displaying at least one of a sticker image or a background image based on the shape of the received at least one first stroke input on the window.

2. The electronic device of claim 1, wherein the second AR emoji includes a gesture, said gesture based on the position and the shape of the at least one first stroke input.

3. The electronic device of claim 1, further comprising:
   a wireless communication circuit configured to communicate with an external electronic device,
   wherein the plurality of operations further comprise:
      receive a first user input for transmitting the second AR emoji while at least one of the second AR emoji, the sticker image, or the background image is displayed;
      generating a first image file including at least one of the second AR emoji, the sticker image, or the background image in response to the received first user input; and
      transmitting the generated first image file to the external electronic device, through the wireless communication circuit.

4. The electronic device of claim 3, wherein plurality of operations further comprise:
- receiving a second stroke input while at least one of the second AR emoji, the sticker image, or the background image is displayed;
- displaying a character corresponding to the second stroke input on the window, through the touchscreen display;
- receiving the first user input while the character is displayed;
- generating a second image file including at least one of the second AR emoji, the displayed character, the sticker image, or the background image in response to the received first user input; and
- transmitting the generated second image file to the external electronic device, through the wireless communication circuit.

5. The electronic device of claim 3, wherein operations further comprise:
- transmitting first information about the received at least one first stroke input to an external server, through the wireless communication circuit;
- receiving second information about the second AR emoji from the external server, through the wireless communication circuit, based at least partially on the transmitted first information; and
- displaying the second AR emoji through the display, based at least partially on the received second information.

6. The electronic device of claim 1, wherein the plurality of operations further comprise:
- receiving a second user input of executing a function associated with transmitting a message;
- displaying the window, through the touchscreen display, in response to the received second user input;
- displaying an object for executing an AR emoji function on a partial area of the window, through the touchscreen display; and
- displaying the first AR emoji on the window, in response to a third user input of selecting the displayed object.

7. The electronic device of claim 1, wherein plurality of operations further comprise:
- displaying an output stroke corresponding to the at least first stroke input on the window while the at least one first stroke input is received;
- displaying the second AR emoji in response to detecting that the at least one first stroke input is completed; and
- allowing the displayed output stroke on the window to fade away.

8. A method of an electronic device comprising:
- displaying a first augmented reality (AR) emoji on a window configured to receive at least one first stroke input;
- receiving the at least one first stroke input on the window;
- displaying a second AR emoji, based at least partially on a position and a shape of the at least one first stroke input; and
- displaying at least one of a sticker image or a background image based on the shape of the received at least one first stroke input on the window.

9. The method of claim 8,
wherein the second AR emoji includes a gesture, said gesture based on the position and the shape of the at least one first stroke input.

10. The method of claim 8, further comprising:
- receiving a first user input for transmitting the second AR emoji while at least one of the second AR emoji, the sticker image, or the background image is displayed;
- generating a first image file including at least one of the second AR emoji, the sticker image, or the background image in response to the received first user input; and
- transmitting the generated first image file to an external electronic device.

11. The method of claim 10, further comprising:
- receiving a second stroke input while at least one of the second AR emoji, the sticker image, or the background image is displayed;
- displaying a character corresponding to the second stroke input on the window;
- receiving the first user input while the character is displayed;
- generating a second image file including at least one of the second AR emoji, the displayed character, the sticker image, or the background image in response to the received first user input; and
- transmitting the generated second image file to the external electronic device.

12. The method of claim 8, further comprising:
- transmitting first information about the received at least one first stroke input to an external server; and
- receiving second information about the second AR emoji, from the external server,
- wherein the displaying of the second AR emoji includes:
- displaying the second AR emoji based at least partially on the received second information.

13. The method of claim 8, further comprising:
- receiving a second user input of executing a function associated with transmitting a message; and
- displaying the window and an object for executing an AR emoji function on a partial area of the window, in response to the received second user input,
- wherein the displaying of the first AR emoji includes:
- displaying the first AR emoji on the window, in response to a third user input of selecting a displayed object.

14. An electronic device comprising:
- a housing;
- a touchscreen display viewable through a portion of the housing;
- a wireless communication circuit disposed within the housing, and configured to communicate with an external server;
- at least one processor disposed within the housing and operatively connected with the display and the wireless communication circuit; and
- a memory disposed within the housing and operatively connected with the at least one processor,
- wherein the memory stores instructions that, when executed, cause the at least one processor to perform a plurality of operations comprising:
  - displaying a first augmented reality (AR) emoji capable of receiving at least one first stroke input, through the display;
  - receiving the at least one first stroke input while displaying the first AR emoji on a window;
  - transmitting information about the at least one first stroke input to the external server, through the wireless communication circuit;
  - receiving information about a second AR emoji indicating a gesture corresponding to the at least one first stroke input from the external server, through the wireless communication circuit;
  - displaying the second AR emoji, through the display, based at least partially on information about the received second AR emoji;

receiving a first user input for transmitting the second AR emoji while the second AR emoji is displayed;

generating a first image file including the second AR emoji in response to the received first user input; and transmitting the generated first image file to an external electronic device, through the wireless communication circuit.

15. The electronic device of claim 14, wherein the plurality of operations further comprise:

receiving a second user input of executing a function associated with transmitting a message;

displaying the window, through the display, in response to the received second user input;

displaying an object for executing an AR emoji function on a partial area of the window, through the display; and displaying the first AR emoji on the window, in response to a third user input of selecting the displayed object.

16. The electronic device of claim 14, wherein the at least one first stroke input includes a first stroke input using a digital pen.

17. The electronic device of claim 14, wherein the plurality of operations further comprise:

displaying an output stroke corresponding to the at least first stroke input on the window while the at least one first stroke input is received;

displaying the second AR emoji in response to detecting that the at least one first stroke input is completed; and fading away the displayed output stroke on the window.

18. The electronic device of claim 14, wherein the plurality of operations further comprise:

receiving a second user input while the second AR emoji is displayed;

displaying a character corresponding to the received second user input on the window, through the display;

generating a second image file including the second AR emoji and the displayed character in response to the received first user input; and transmitting the generated second image file to the external electronic device, through the wireless communication circuit.

* * * * *